United States Patent
Hirano

(10) Patent No.: US 11,124,995 B2
(45) Date of Patent: Sep. 21, 2021

(54) PUSH-LIFTER FOR VEHICLE

(71) Applicant: NIFCO INC., Yokosuka (JP)

(72) Inventor: Yoichi Hirano, Yokosuka (JP)

(73) Assignee: NIFCO INC., Yokosuka (JP)

( * ) Notice: Subject to any disclaimer, the term of this patent is extended or adjusted under 35 U.S.C. 154(b) by 436 days.

(21) Appl. No.: 16/275,900

(22) Filed: Feb. 14, 2019

(65) Prior Publication Data

US 2019/0264475 A1 Aug. 29, 2019

(30) Foreign Application Priority Data

Feb. 28, 2018 (JP) .............................. JP2018-034387

(51) Int. Cl.
| | |
|---|---|
| *E05B 63/22* | (2006.01) |
| *E05B 83/34* | (2014.01) |
| *E05F 1/08* | (2006.01) |
| *B60K 15/05* | (2006.01) |
| *E05F 1/10* | (2006.01) |

(52) U.S. Cl.
CPC .............. *E05B 83/34* (2013.01); *E05B 63/22* (2013.01); *E05F 1/08* (2013.01); *B60K 15/05* (2013.01); *B60K 2015/0523* (2013.01); *E05F 1/105* (2013.01); *E05Y 2800/12* (2013.01); *E05Y 2900/534* (2013.01)

(58) Field of Classification Search
CPC .......... E05B 83/34; E05B 63/22; E05B 83/28; E05F 1/08; E05F 1/105; B60K 15/05; B60K 2015/0523; E05Y 2800/12; E05Y 2900/534; Y10S 292/04
See application file for complete search history.

(56) References Cited

U.S. PATENT DOCUMENTS

| | | | |
|---|---|---|---|
| 8,845,001 B2 * | 9/2014 | Kotama ................... | B60K 1/04 |
| | | | 296/97.22 |
| 2015/0061314 A1 * | 3/2015 | Beck ....................... | E05B 81/66 |
| | | | 296/97.22 |

FOREIGN PATENT DOCUMENTS

| | | | | |
|---|---|---|---|---|
| CN | 101612887 A | * | 12/2009 | |
| JP | 2010036858 A | * | 2/2010 | |
| JP | 6183321 B2 | | 8/2017 | |
| WO | WO-2012161087 A1 | * | 11/2012 | ............. B60K 15/05 |
| WO | WO-2015105193 A1 | * | 7/2015 | ............. B60K 15/05 |
| WO | WO-2015162861 A1 | * | 10/2015 | ............. B60K 15/05 |

* cited by examiner

*Primary Examiner* — Kristina R Fulton
*Assistant Examiner* — Tal Saif
(74) *Attorney, Agent, or Firm* — Manabu Kanesaka

(57) ABSTRACT

A push-lifter for a vehicle drains water entered into an inside through a drainage portion. A lower portion of a case includes a peripheral wall, a bottom wall, and an air vent portion opening at a center of the bottom wall. A cap includes a bottom portion located away from the bottom wall, and forming a first air flow channel communicating with the air vent portion between the bottom portion and the bottom wall; a side portion located away from the peripheral wall by continuing to the bottom portion, and having a cylindrical shape forming a second air flow channel communicating with the first air flow channel between the side portion and the peripheral wall; and a drainage portion located on a lower side in an attachment state of the case relative to a vehicle body side, communicating with the second air flow channel, and opening toward the bottom portion.

3 Claims, 40 Drawing Sheets

PUSH-LIFTER FOR VEHICLE

CROSS-REFERENCE TO RELATED APPLICATION

The present application is based on and claims priority of Japanese Patent Application No. 2018-034387 filed on Feb. 28, 2018, the disclosure of which is incorporated herein.

BACKGROUND OF THE INVENTION AND RELATED ART STATEMENT

The present invention relates to a push-lifter for a vehicle for pushing a fuel lid, openably and closably attached to a vehicle body, to open toward an outside of a vehicle so as to drain water entering into an inside through a drainage portion.

Conventionally, when water flows down from a lower end of an attaching member, there is known a "filler lid structure for vehicle" wherein a flange portion is provided at a position on an upper side on a lower end outer periphery of the attaching member which comes to a position where the water easily enters into a push lifter (for example, see paragraph [0014], and FIG. 4 and FIG. 6 of Patent Document 1).

Patent Document 1
  Japanese Patent No. 6183321

SUMMARY OF THE INVENTION

Problems to be Solved by the Invention

In the aforementioned conventional structure, however, there is a problem such that when water climbs over the flange portion of the attaching member, the water enters into the inside from an air hole of the push lifter so as to rust a sprig member.

There, each invention according to each aspect is made in view of the problem that the aforementioned conventional technology has, and an object thereof is as follows.

(First Aspect)

The invention according to the first aspect has the following object.

Namely, in the invention according to the first aspect, water entering into an inside can drain through a drainage portion.

In addition to this, in the invention according to the first aspect, the drainage portion is provided on a lower side in an attachment state of a case relative to a vehicle body side, and an air vent portion is located upwardly relative to the drainage portion so as to suppress the water from entering into the air vent portion through the drainage portion.

(Second Aspect)

As for the invention according to a second aspect, in addition to an object of the invention according to the aforementioned first aspect, there is the following object. Namely, the invention according to the second aspect can suppress the water from entering from the drainage portion by meandering a flow channel for the water in the drainage portion.

(Third Aspect)

The invention according to a third aspect has the following object.

Namely, in the invention according to the third aspect, a peripheral wall of the case is doubled, and the drainage portion is provided internally, and in the attachment state of the case relative to the vehicle body side, the air vent portion is located upwardly relative to the drainage portion so as to suppress the water from entering into the air vent portion through the drainage portion.

Further objects and advantages of the invention will be apparent from the following description of the invention.

Means to Solve the Invention

Each invention according to each aspect is made in order to obtain the aforementioned objects, and characteristics of each invention will be explained as follows using embodiments of the invention shown in drawings. Incidentally, symbols in parentheses represent symbols used in the embodiments of the invention, and do not limit a technical scope of the present invention.

Also, numbers represent drawing numbers used in the embodiments of the invention, and do not limit the technical scope of the present invention.

(First Aspect)

The invention according to the first aspect has the following characteristics. First, for example, as shown in FIG. 1, the invention is a push lifter (10) fixed to a vehicle body side facing a fuel lid (not shown in the drawings) for pushing the fuel lid to open toward an outside of a vehicle.

Secondly, for example, as shown in FIG. 1 and FIG. 3, the push lifter (10) has the following structure.

(1) Case (20), for Example, as Shown in FIG. 3, the Case (20) has a Cylindrical Shape Fixed to the Vehicle Body Side (not Shown in the Drawings).

(2) Push Rod (30)

For example, as shown in FIG. 1, FIG. 3, and FIG. 13, the push rod (30) is slidably held inside the case (20), and protrudes from an inside of the case (20) to push the fuel lid (not shown in the drawings) to open.

(3) Urging Device (for Example, a Spring 40)

For example, as shown in FIG. 1 and FIG. 3, the urging device (for example, the spring 40) is located inside the case (20), and urges the push rod (30) toward a forward-movement position protruding from the inside of the case (20).

(4) Lock Device

For example, as shown in FIG. 1 and FIG. 3, the lock device is located between the case (20) and the push rod (30), and for example, as shown in FIG. 13, the lock device locks the push rod (30) to a backward-movement position of the case (20) by pushing the push rod (30) against an urging force of the urging device (for example, the spring 40).

Here, the "lock device" is formed by a lock portion (56) of an inner part (50) shown in, for example, FIG. 21 and FIG. 22, and an engagement projection (61) of a rotation cam (60) shown in, for example, FIG. 45. In the lock device, a state wherein the engagement projection (61) fits into a locking groove (55) of the lock portion (56) becomes a locked state (for example, see FIG. 13), and a state wherein the engagement projection (61) is disengaged from the locking groove (55) becomes an unlocked state (for example, see FIG. 1).

Thirdly, in a case (for example, a case main member 90), for example, as shown in FIG. 1 and FIG. 3, there is provided a cap (100) having a cylindrical shape for covering an outside of a lower portion (95) of the case (for example, the case main member 90).

Fourthly, in the lower portion (95) of the case (for example, the case main member 90), for example, as shown in FIG. 1 and FIG. 16, the following structures are provided.

(5) Peripheral Wall (for Example, an Inner Peripheral Wall 110)

For example, as shown in FIG. 1 and FIG. 16, the peripheral wall (for example, the inner peripheral wall 110) has a cylindrical shape surrounding a circumference of the lower portion (95).

(6) Bottom Wall (111)

For example, as shown in FIG. 1 and FIG. 16, the bottom wall (111) closes a bottom of the peripheral wall (for example, the inner peripheral wall 110).

(7) Air Vent Portion (114)

For example, as shown in FIG. 1 and FIG. 16, the air vent portion (114) opens at a center of the bottom wall (111).

Fifthly, for example, as shown in FIG. 1 and FIG. 20, a cap (100) has the following structure.

(8) Bottom Portion (120)

For example, as shown in FIG. 1 and FIG. 20, the bottom portion (120) is located away from the bottom wall (111) to face the bottom wall (111), and forms a first air flow channel (130) communicating with the air vent portion (114) between the bottom portion (120) and the bottom wall (111).

(9) Side Portion (121)

For example, as shown in FIG. 1 and FIG. 20, the side portion (121) is located away from the peripheral wall (for example, the inner peripheral wall 110) and continuing to the bottom portion (120), and has a cylindrical shape forming a second air flow channel (131) communicating with the first air flow channel (130) between the side portion (121) and the peripheral wall (for example, the inner peripheral wall 110).

(10) Drainage Portion (122)

For example, as shown in FIG. 1 and FIG. 20, the drainage portion (122) is located on a lower side in an attachment state of the case (for example, the case main member 90) relative to the vehicle body side, communicates with the second air flow channel (131), and opens toward the bottom portion (120).

Here, in "the attachment state of the case (for example, the case main member 90) relative to the vehicle body side", for example, as shown in FIG. 1, a boot (80) side is located in an attachment upward direction (a), and a case (20) side is located on the lower side.

For example, the boot (80) side is located on an upper side, is attached such that a lower portion (95) side of the case (20) inclines downwardly in an obliquely downward direction, and the boot (80) side is formed such that when water enters into the case (20), for example, as shown in FIG. 1, the water drains toward a water-flow downward direction (b) from the drainage portion (122).

(Second Aspect)

In addition to the characteristics of the invention according to the aforementioned first aspect, the invention according to the second aspect has the following characteristics. First, for example, as shown in FIG. 1 and FIG. 20, the drainage portion (122) is formed by the following structure.

(1) Groove Portion (123)

For example, as shown in FIG. 1 and FIG. 20, the groove portion (123) is concaved outwardly in a radial direction from an inner peripheral face of the side portion (121), and communicates with the second air flow channel (131).

(2) Opening Portion (124)

For example, as shown in FIG. 1 and FIG. 20, the opening portion (124) opens toward the bottom portion (120) from the groove portion (123).

Secondly, for example, as shown in FIG. 1 and FIG. 20, the drainage portion (122) drains water flowing down through the second air flow channel (131) toward the opening portion (124) from the groove portion (123) while meandering in an L shape in cross section.

(Third Aspect)

The invention according to the third aspect has the following characteristics. First, the invention is the push lifter (10) fixed to the vehicle body side facing the fuel lid (not shown in the drawings), and for example, as shown in FIG. 51 and FIG. 57, and pushing the fuel lid to open toward the outside of the vehicle.

Secondly, for example, as shown in FIG. 51 and FIG. 57, the push lifter (10) has the following structure.

(1) Case (200)

For example, as shown in FIG. 51 and FIG. 57, the case (200) has a cylindrical shape fixed to the vehicle body side (not shown in the drawings).

(2) Push rod (30)

For example, as shown in FIG. 51, FIG. 57, and FIG. 61, the push rod (30) is slidably held inside the case (200), and protrudes from an inside of the case (200) to push the fuel lid (not shown in the drawings) to open.

(3) Urging Device (for Example, the Spring 40)

For example, as shown in FIG. 51 and FIG. 57, the urging device (for example, the spring 40) is located inside the case (200), and urges the push rod (30) toward the forward-movement position protruding from the inside of the case (200).

(4) Lock Device

For example, as shown in FIG. 51 and FIG. 57, the lock device is located between the case (200) and the push rod (30), and for example, as shown in FIG. 61, the lock device is for locking the rod to the backward-movement position of the case (200) by pushing the push rod (30) against an urging force of the urging device (for example, the spring 40).

Incidentally, the lock device is formed in a manner similar to the lock device of the first aspect explained previously.

Thirdly, for example, as shown in FIG. 55 and FIG. 57, the case (200) has the following structure.

(5) Inner Peripheral Wall (210)

For example, as shown in FIG. 55 and FIG. 57, the inner peripheral wall (210) has the cylindrical shape.

(6) Bottom Wall (211)

For example, as shown in FIG. 55 and FIG. 57, the bottom wall (211) closes a bottom of the inner peripheral wall (210).

(7) Folded Portion (212)

For example, as shown in FIG. 57, the folded portion (212) is located at an upper edge portion on a side opposite to a lower edge portion where the bottom wall (211) continues in the inner peripheral wall (210), and annularly extends outwardly in the radial direction from the inner peripheral wall (210).

(8) Outer Peripheral Wall (213)

For example, as shown in FIG. 55 and FIG. 57, the outer peripheral wall (213) continues to the folded portion (212), and surrounds a circumference of the inner peripheral wall (210) away from the inner peripheral wall (210).

(9) Drainage Portion (214)

For example, as shown in FIG. 55 and FIG. 57, the drainage portion (214) is located between the inner peripheral wall (210) and the outer peripheral wall (213), and opens at a bottom toward a bottom wall (211) side, and in an attachment state of the case (200) relative to the vehicle body side, the drainage portion (214) can drain toward an open face.

Here, in "the attachment state of the case (200) relative to the vehicle body side", for example, as shown in FIG. 57, the boot (80) side is located in an attachment upward direction (c), and a case (200) side is located on the lower side.

For example, the boot (80) side is located on the upper side, is attached such that the bottom wall (211) side of the case (200) inclines downwardly in the obliquely downward direction, and the boot (80) side is formed such that when water enters into the case (200), the water flows down through an inside of the drainage portion (214) toward the open face so as to drain from the open face.

(10) Air Vent Portion (215)

For example, as shown in FIG. 55, the air vent portion (215) is located in the folded portion (212), and communicates with an inside of the inner peripheral wall (210) and the drainage portion (214).

Here, although it is not shown in the drawings, the air vent portion (215) is located on an upper side relative to the open face of the drainage portion (214) in the attachment state of the case (200) relative to the vehicle body side.

The present invention is formed in the aforementioned structures so as to have effects described as follows.

(First Aspect)

According to the invention described in the first aspect, the following effect is provided.

Namely, according to the invention described in the first aspect, the water entering into the inside can drain through the drainage portion.

In addition to this, according to the invention described in the first aspect, the drainage portion is provided on the lower side in the attachment state of the case relative to the vehicle body side, and the air vent portion is located on the upper side relative to the drainage portion so as to suppress the water from entering into the air vent portion through the drainage portion.

(Second Aspect)

As for the invention according to the second aspect, in addition to the effect of the invention according to the aforementioned first aspect, there is the following effect.

Namely, the invention according to the second aspect can suppress the water from entering from the drainage portion by meandering the flow channel for the water in the drainage portion.

(Third Aspect)

The invention according to the third aspect has the following effect.

Namely, according to the invention described in the third aspect, the peripheral wall of the case is doubled, and the drainage portion is provided internally, and in the attachment state of the case relative to the vehicle body side, the air vent portion is positioned on the upper side relative to the drainage portion so as to suppress the water from entering into the air vent portion through the drainage portion.

BRIEF DESCRIPTION OF THE DRAWINGS

FIG. 5(*b*) is a right side view;

DETAILED DESCRIPTION OF THE INVENTION

First Embodiment

Figure 1:
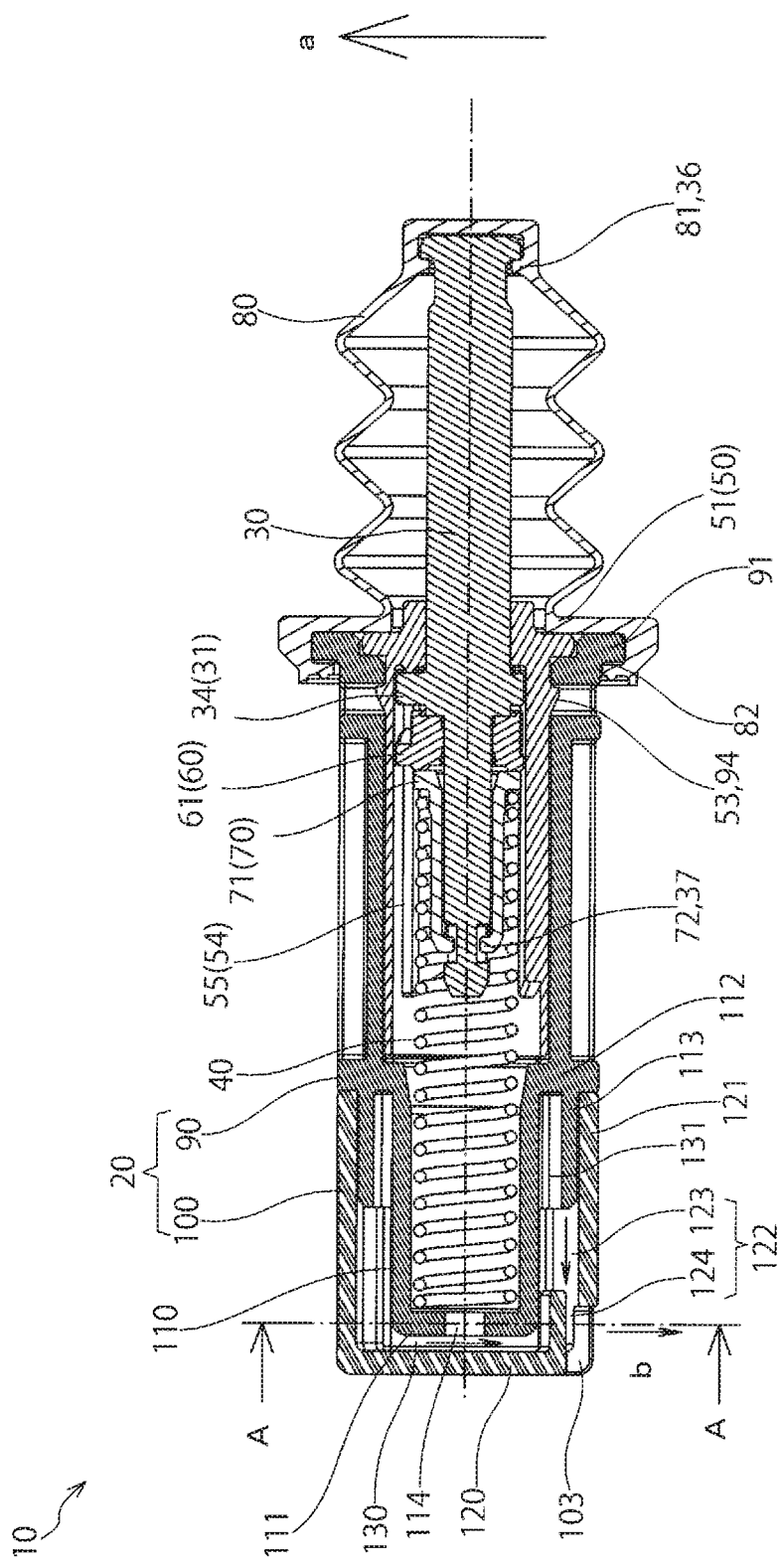
FIG. 1 shows the first embodiment of the present invention, and is a cross-sectional view taken along a line C-C in FIG. 6.

With FIG. 1 to FIG. 50, the first embodiment of a push lifter 10 will be explained. Although it is not shown in the drawings, the push lifter 10 is fixed to a vehicle body side facing a fuel lid (not shown in the drawings), and as shown in FIG. 1, in an unlocked state, the push lifter 10 pushes to open the fuel lid toward an outside of a vehicle.

In the push lifter 10, in an attachment state of the later-described case 20 relative to the vehicle body side, as shown in FIG. 1, the later-described boot 80 side is located in an attachment upper direction a, and a case 20 side is located on a lower side.

Figure 2:
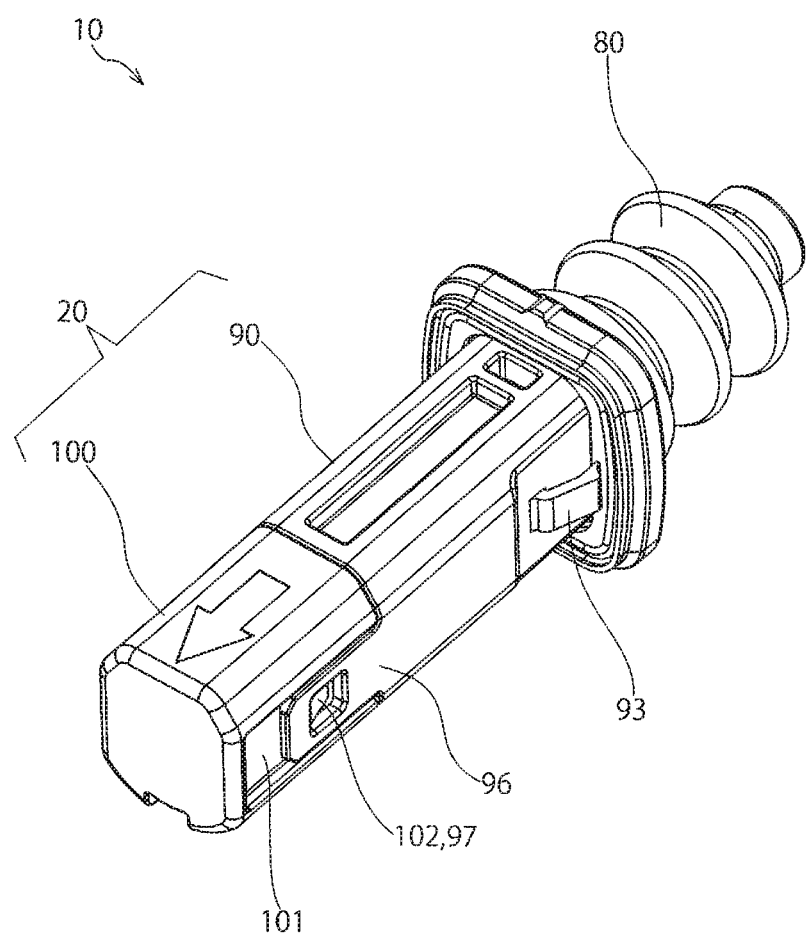
FIG. 2 is a perspective view of a push lifter.
Figure 6:
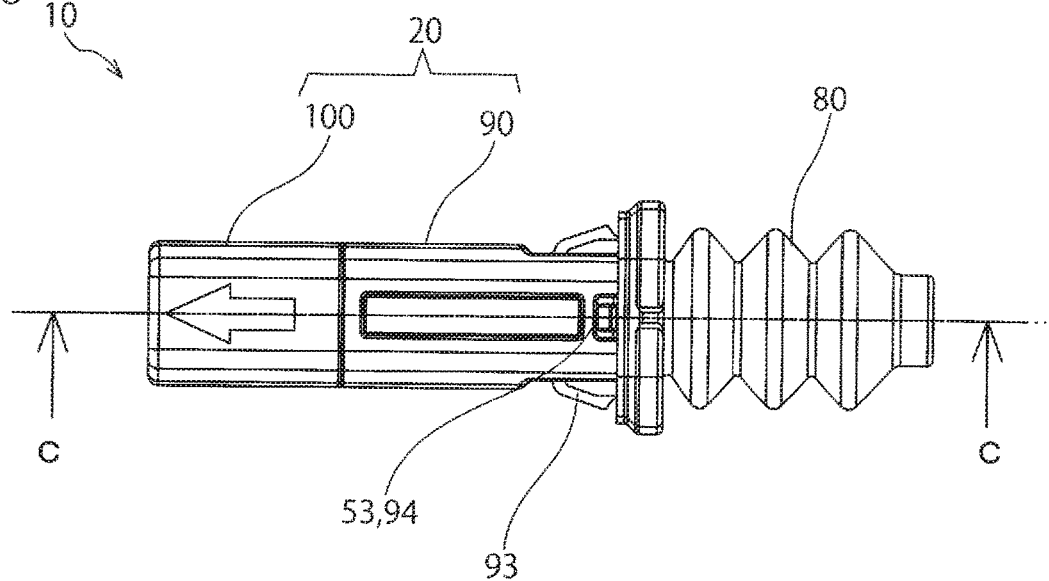
FIG. 6 is a plan view of the push lifter.
Figure 7:
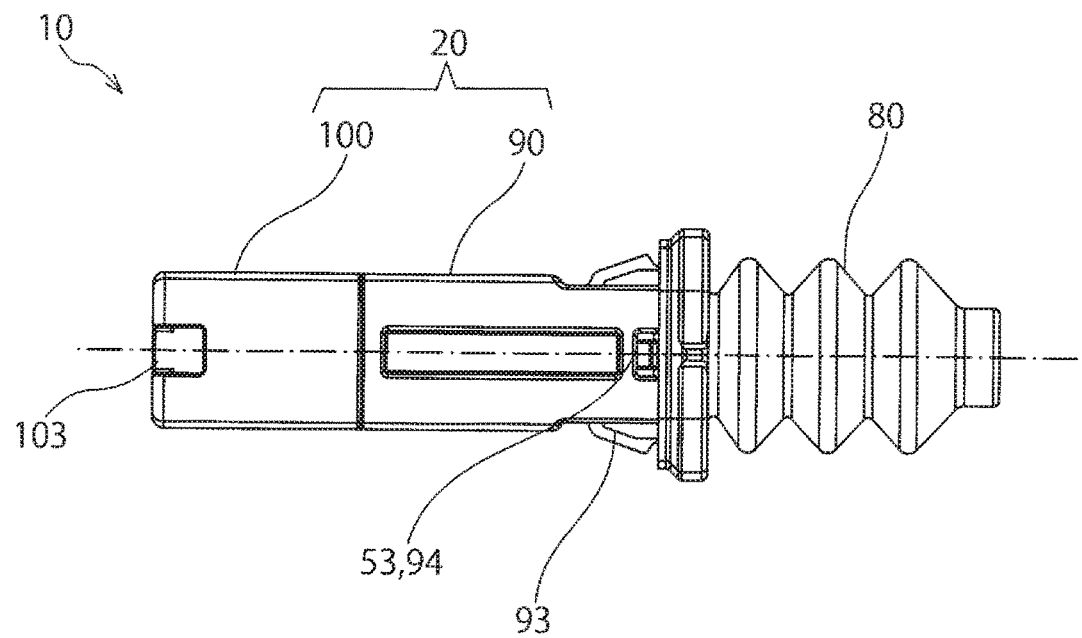
FIG. 7 is a bottom view of the push lifter.
Figure 8:
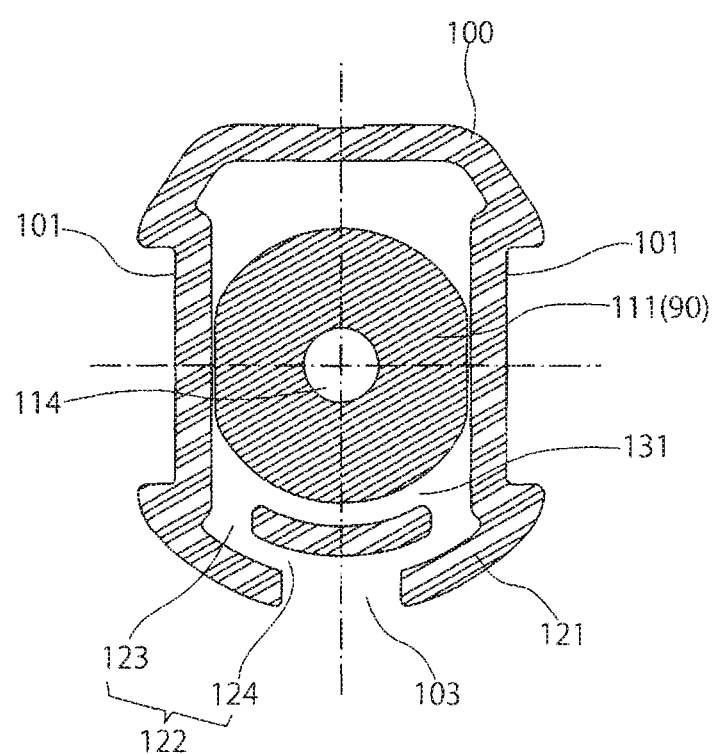
FIG. 8 is a cross-sectional view taken along a line A-A in FIG. 1.

Specifically, the push lifter 10 is formed such that the boot 80 side is located on an upper side, the later-described bottom wall 111 side of the case 20 is attached in such a way so as to incline downwardly in an obliquely downward direction, and when water enters into the later-described case main member 90, the water flows down toward a water-flow downward direction b from a drainage portion 122 of the later-described cap 100 to drain. Here, as shown in FIG. 2 and FIG. 6, the cap 100 is attached such that an arrow mark faces upwardly and the later-described recessed portion 103 faces downwardly.

Figure 3:
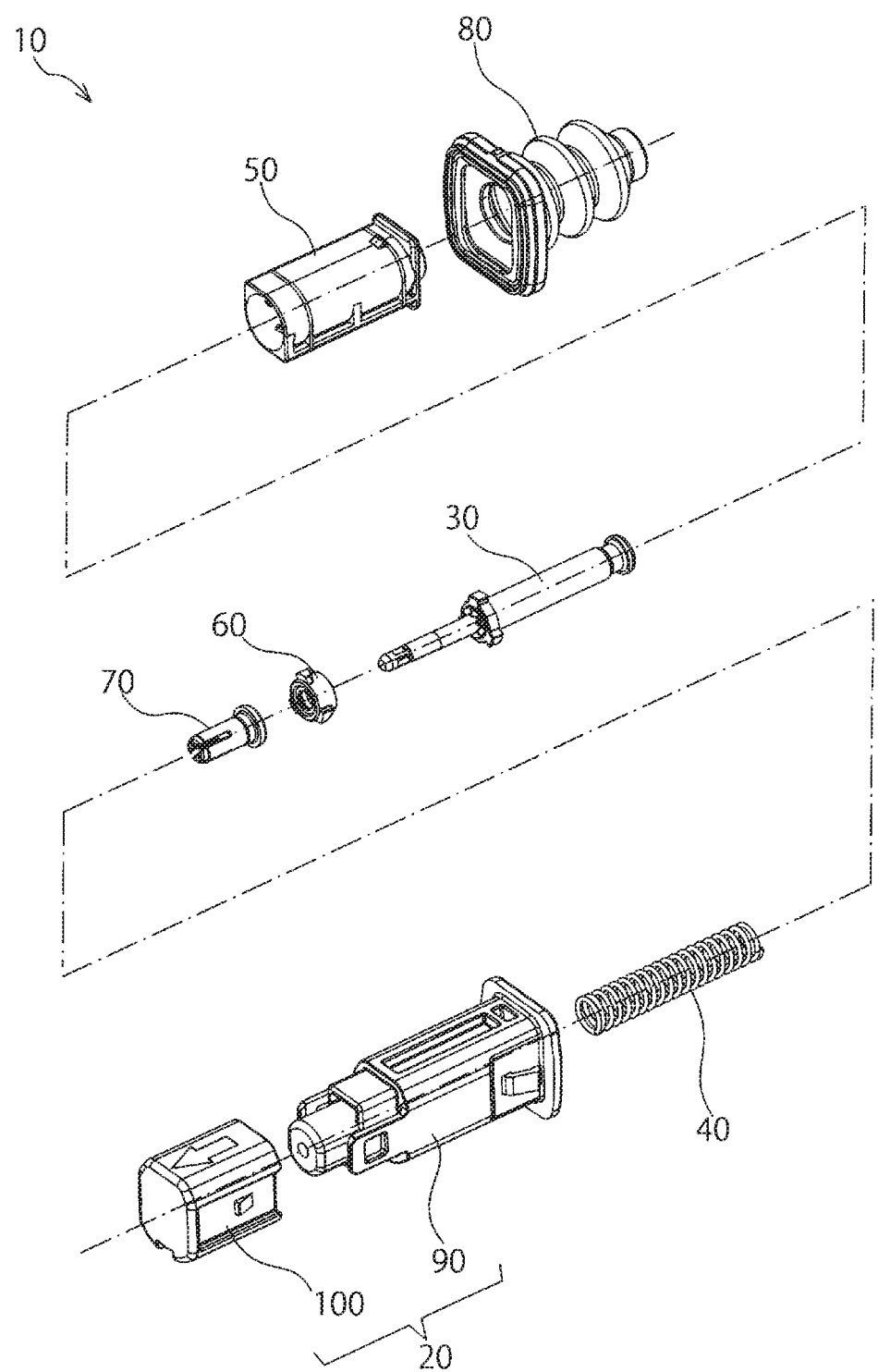
FIG. 3 is an exploded perspective view of the push lifter.
Figure 4:
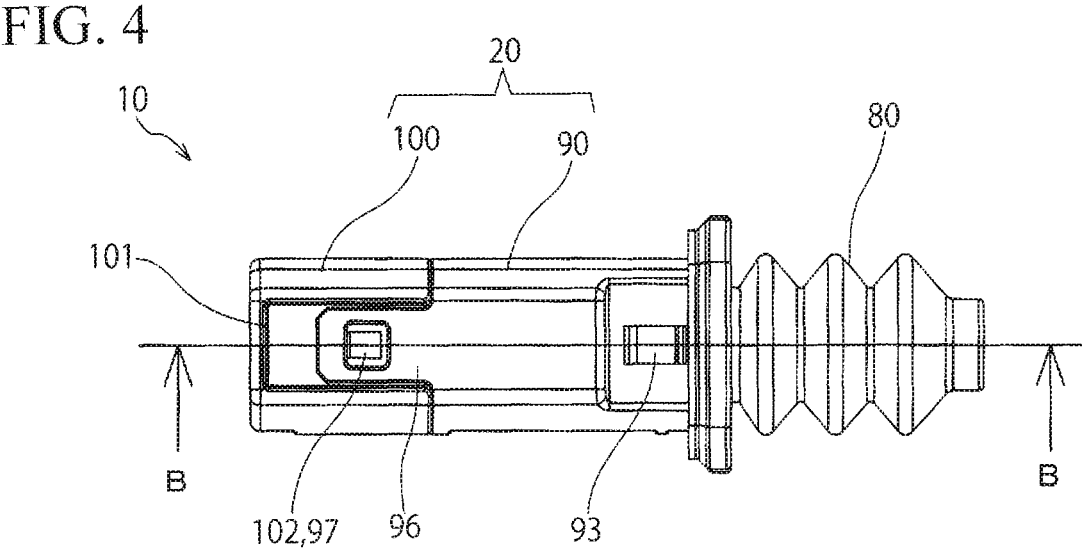
FIG. 4 is a front view of the push lifter.
Figure 5A:
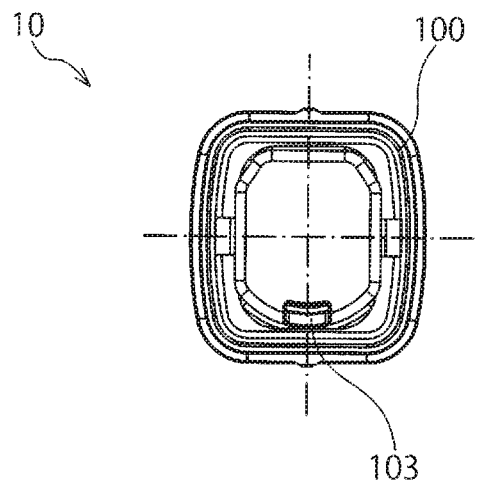
FIGS. 5(*a*) and 5(*b*) are side views of the push lifter, wherein FIG. 5(*a*) is a left side view.
Figure 5B:
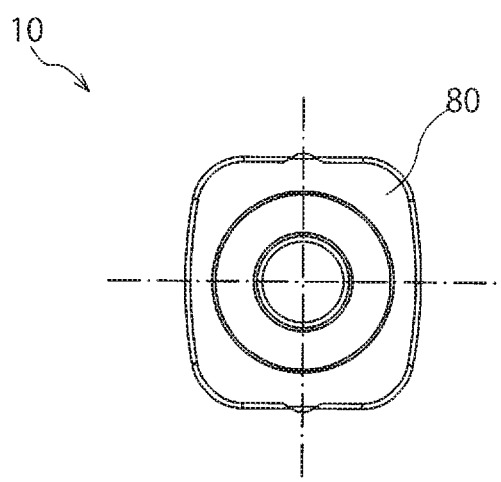

As shown in FIG. 3, the push lifter 10 broadly comprises the following parts.

Incidentally, the following parts will be described later.

(1) Case 20
(2) Push rod 30
(3) Spring 40 (urging device)
(4) Inner portion 50
(5) Rotating cam 60
(6) Sleeve 70
(7) Boot 80

Incidentally, the parts of the push lifter 10 are not limited to the aforementioned (1) to (7), and may comprise other parts such as a water stop O-ring and the like.

(Case 20)

As shown in FIG. 3, the case 20 has a cylindrical shape fixed to the vehicle body side (not shown in the drawings).

As shown in FIG. 3, the case 20 broadly comprises the following parts.

Incidentally, the following parts will be described later.

(1) Case main member 90
(2) Cap 100

Incidentally, the parts of the case 20 are not limited to the aforementioned (1) and (2), and may comprise other parts such as the water stop O-ring and the like.

(Case Main Member 90)

As shown in FIG. 3, and FIG. 14 to FIG. 16, the case main member 90 has a cylindrical shape fixed to the vehicle body side (not shown in the drawings). The case main member 90 is formed in a rectangular cylindrical shape wherein one end portion is open and the other end portion is closed by the later-described bottom wall 111.

The case main member 90 is integrally formed by a thermoplastic synthetic resin having moderate elasticity and rigidity, for example, POM.

The case main member 90 comprises the following respective portions.

Incidentally, the following (1) to (7) will be described later.

(1) Flange portion 91
(2) Body portion 92
(3) Vehicle-body attachment claws 93
(4) Inner attachment holes 94
(5) Lower portion 95
(6) Elastic pieces 96
(7) Cap attachment holes 97

(Flange Portion 91)

Figure 14:
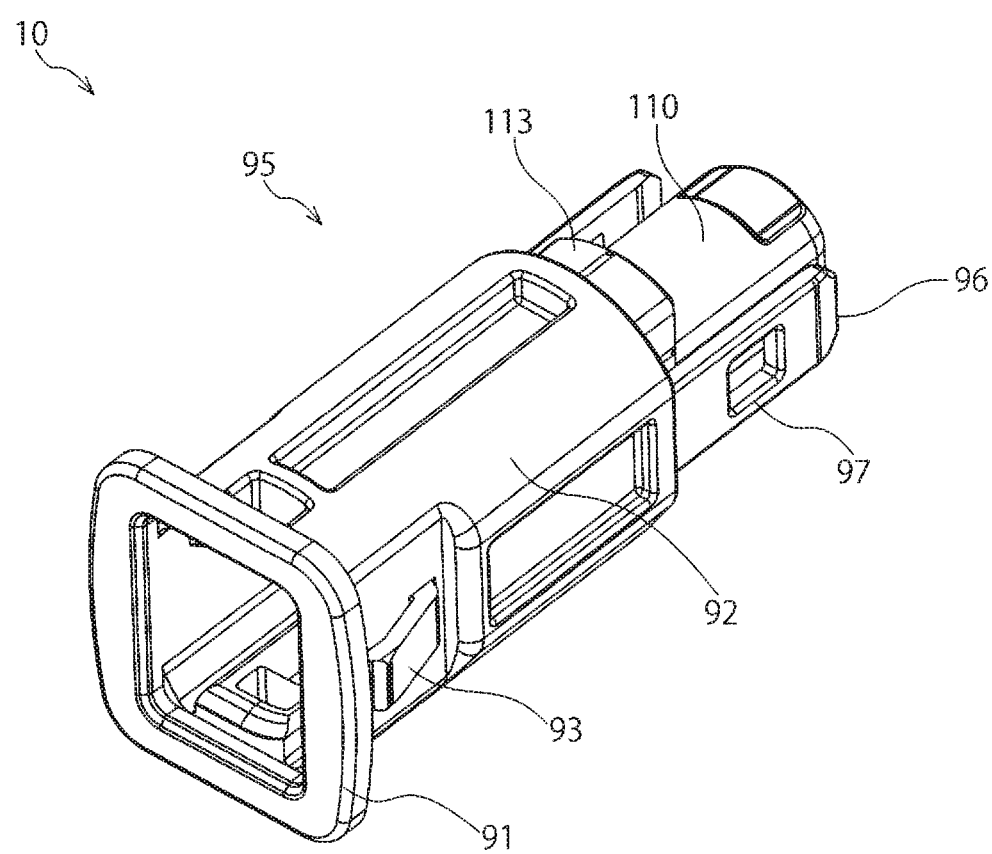
FIG. 14 is a perspective view of a case main member.
Figure 15:
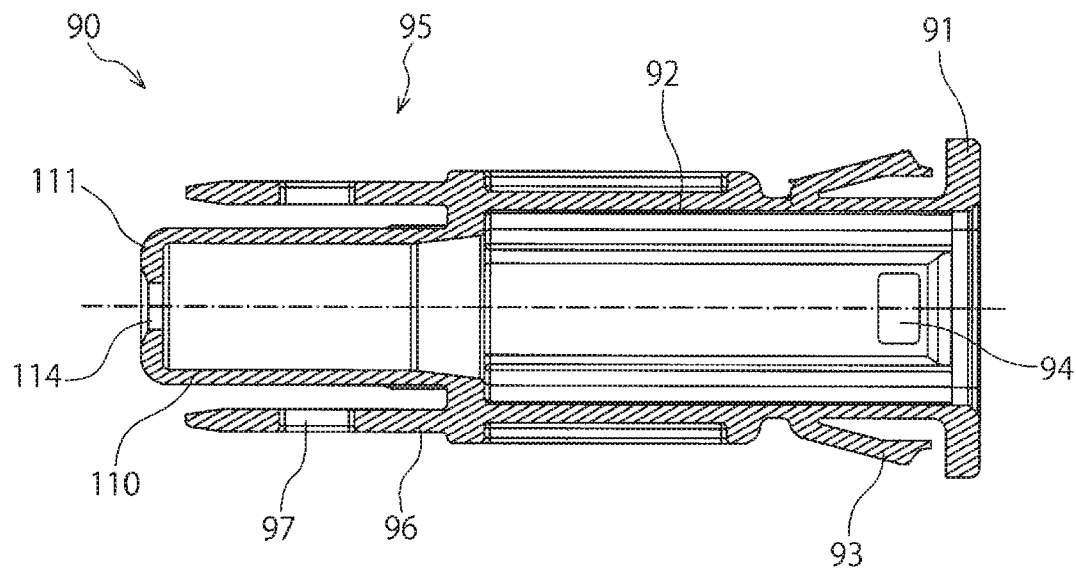
FIG. 15 is a horizontal cross-sectional view of the case main member.
Figure 16:
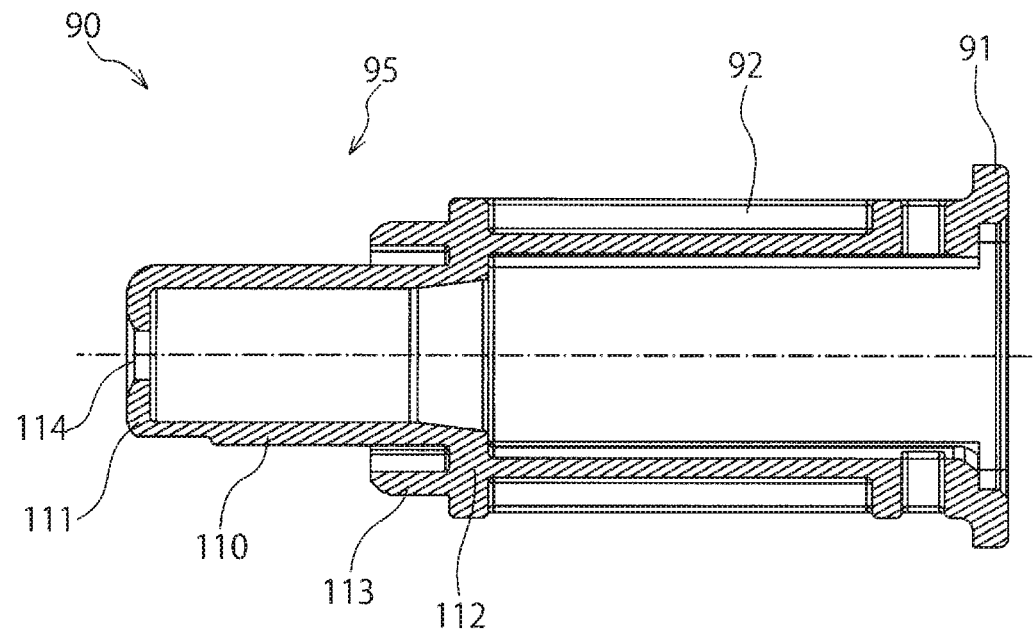
FIG. 16 is a vertical cross-sectional view of the case main member.

As shown in FIG. 14 to FIG. 16, the flange portion 91 is located on an opening side of the case main member 90, and projects in a square ring shape in a plan view from an end portion thereof.

(Body Portion 92)

As shown in FIG. 14 to FIG. 16, the body portion 92 is formed in a hollow rectangular cylindrical shape from the flange portion 91.

(Vehicle-Body Attachment Claws 93)

As shown in FIG. 14 to FIG. 16, a pair of vehicle-body attachment claws 93 projects in a claw shape from side faces arranged back to back in the body portion 92, and faces each other away from the flange portion 91. Although it is not shown in the drawings, the case main member 90 is unrotatably fixed to the vehicle body side (not shown in the drawings) by the pair of vehicle-body attachment claws 93.

(Inner Attachment Holes 94)

As shown in FIG. 14 to FIG. 16, the inner attachment holes 94 are formed in a rectangular hole shape on the side faces arranged back to back in the body portion 92, i.e. by having a phase difference of 90 degrees different from the vehicle-body attachment claws 93. As shown in FIG. 1, the inner portion 50 is inserted into a hollow portion of the body portion 92, and case attachment claws 53 of the inner portion 50 fit into the inner attachment holes 94 from an inside, so that the inner portion 50 is unrotatably fixed into the hollow portion of the body portion 92.

(Lower Portion 95)

As shown in FIG. 14 to FIG. 16, the lower portion 95 is located on the later-described closed bottom wall 111 side of the case main member 90, and in the attachment state of the case 20 relative to the vehicle body side, the lower portion 95 is located on the lower side. The lower portion 95 is formed in a cylindrical shape formed one step thinner than the body portion 92 having the rectangular cylindrical shape.

The lower portion 95 comprises the following respective portions.

Incidentally, the following (1) to (5) will be described later.

---
(1) Inner peripheral wall 110
(2) Bottom wall 111
(3) Folded portions 112
(4) Outer peripheral wall 113
(5) Air vent portion 114
---

(Elastic Pieces 96)

Figure 9:
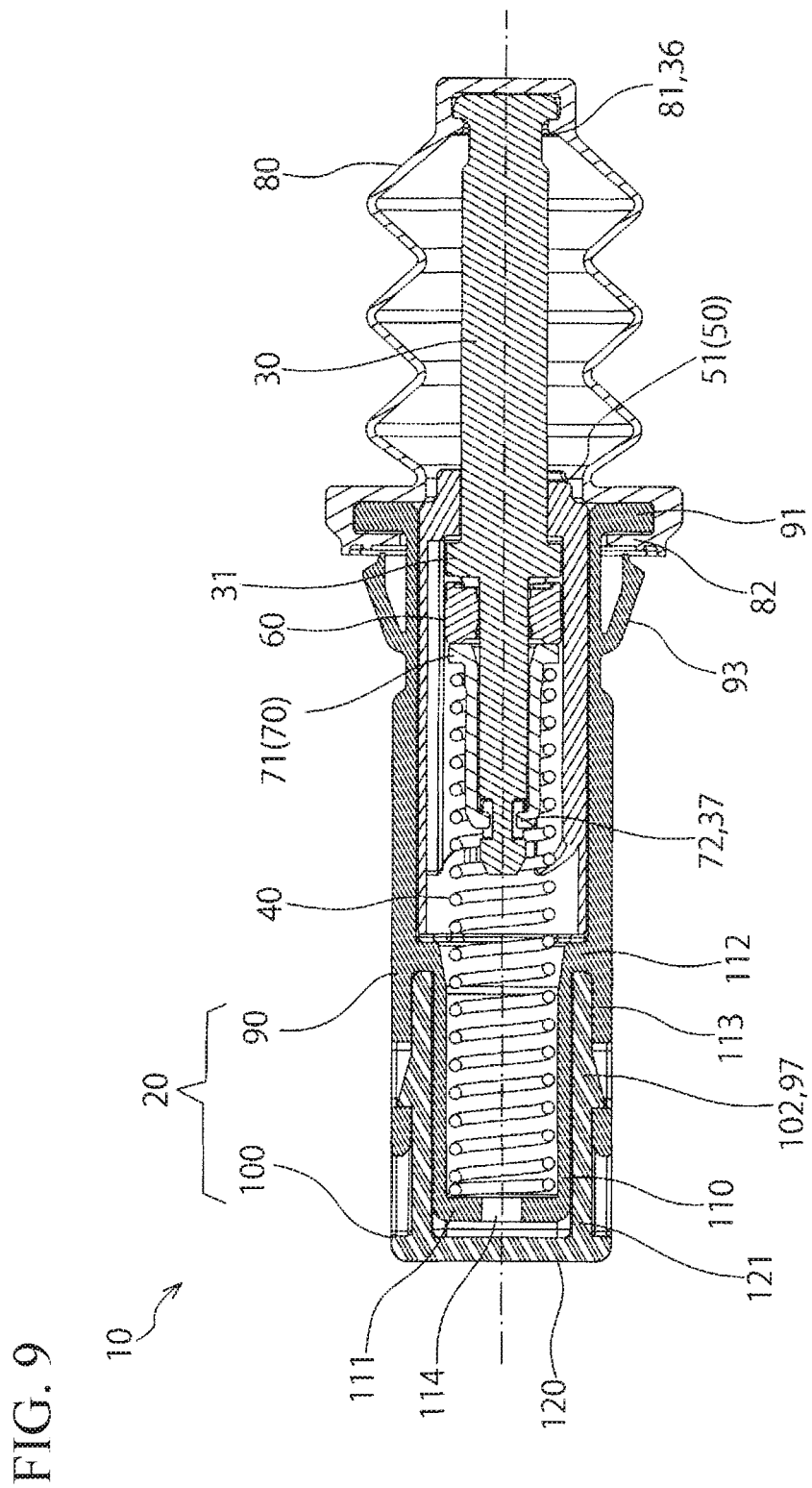
FIG. 9 is a cross-sectional view taken along a line B-B in FIG. 4.
Figure 10:
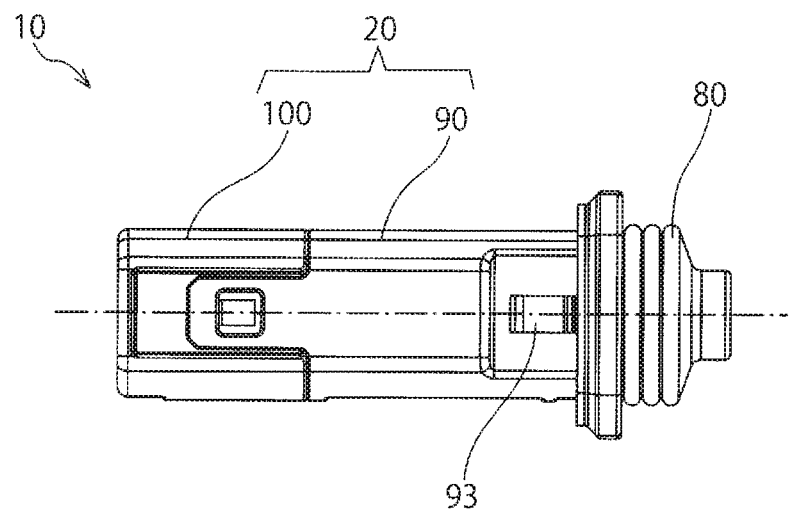
FIG. 10 is a front view in a locked state of the push lifter.
Figure 11:
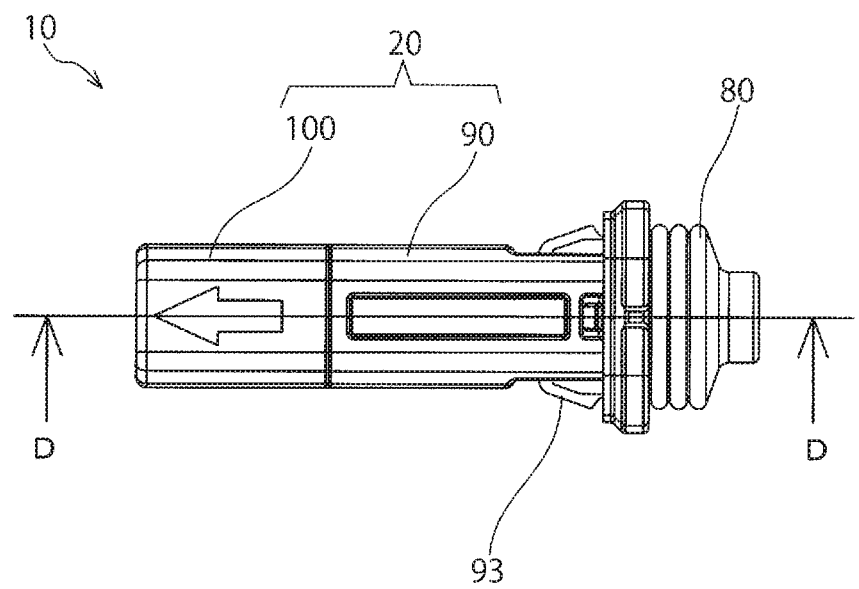
FIG. 11 is a plan view in the locked state of the push lifter.
Figure 12:
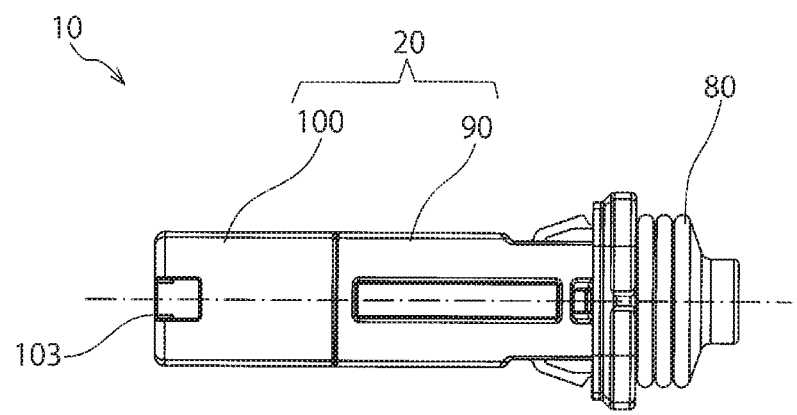
FIG. 12 is a bottom view in the locked state of the push lifter.

As shown in FIG. 14 and FIG. 15, a pair of elastic pieces 96 is formed to extend parallel to the lower portion 95, which has the cylindrical shape and formed one step thinner than the body portion 92 having the rectangular cylindrical shape, and to be located on side faces on a side same as the pair of vehicle-body attachment claws 93. As shown in FIG. 9, when the cap 100 is attached, the elastic pieces 96 fit into the later-described pair of guide grooves 101.

(Cap Attachment Holes 97)

As shown in FIG. 14 and FIG. 15, the cap attachment holes 97 are located on a way of the pair of elastic pieces 96, and pass through front and rear faces in a rectangular shape. As shown in FIG. 9, when the cap 100 is attached, the later-described pair of case attachment claws 102 fits into the cap attachment holes 97.

(Inner Peripheral Wall 110 of the Lower Portion 95)

Inner Peripheral Wall 110 of the Lower Portion 95

As shown in FIG. 14 to FIG. 16, the inner peripheral wall 110 has a cylindrical shape surrounding a circumference of the lower portion 95, and is also called a "peripheral wall".

(Bottom Wall 111)

As shown in FIG. 14 to FIG. 16, the bottom wall 111 closes a bottom of the inner peripheral wall 110 (peripheral wall).

(Folded Portions 112)

As shown in FIG. 14 and FIG. 16, a pair of folded portions 112 is formed on side faces arranged back to back of the inner peripheral wall 110, i.e. by having a phase difference of 90 degrees different from the elastic pieces 96. Also, the folded portions 112 are located on an upper edge portion on a side opposite to a lower edge portion to which the bottom wall 111 continues in the inner peripheral wall 110, and annularly extend outwardly in a radial direction from the inner peripheral wall 110.

(Outer Peripheral Wall 113)

As shown in FIG. 14 and FIG. 16, the outer peripheral wall 113 continues to the folded portion 112, and surrounds a circumference of the inner peripheral wall 110 away from the inner peripheral wall 110. A pair of outer peripheral walls 113 is formed, and is formed to be shorter than the elastic pieces 96. Also, in the attachment state of the cap 100, the outer peripheral wall 113 protrudes into the later-described groove portion 123 of the cap 100, and has a function of narrowing the later-described drainage portion 122 inside the groove portion 123 likewise described later, and of meandering an inside in an L shape in cross section.

(Air Vent Portion 114)

As shown in FIG. 15 and FIG. 16, the air vent portion 114 opens in a circle at a center of the bottom wall 111.

(Cap 100)

As shown in FIG. 1, FIG. 3, and FIG. 17 to FIG. 20, the cap 100 has a cylindrical shape for covering the case 20, i.e. an outside of the lower portion 95 of the case main member 90.

The cap 100 is integrally formed by the thermoplastic synthetic resin having the moderate elasticity and rigidity, for example, PP.

As shown in FIG. 17 to FIG. 20, the cap 100 comprises the following respective portions.

Incidentally, the following (1) to (8) will be described later.

---
(1) Guide grooves 101
(2) Case attachment claws 102
(3) Recessed portion 103
(4) Bottom portion 120
(5) Side portion 121
(6) Drainage portion 122
(7) Groove portion 123
(8) Opening portion 124
---

(Guide Grooves 101)

Figure 17:
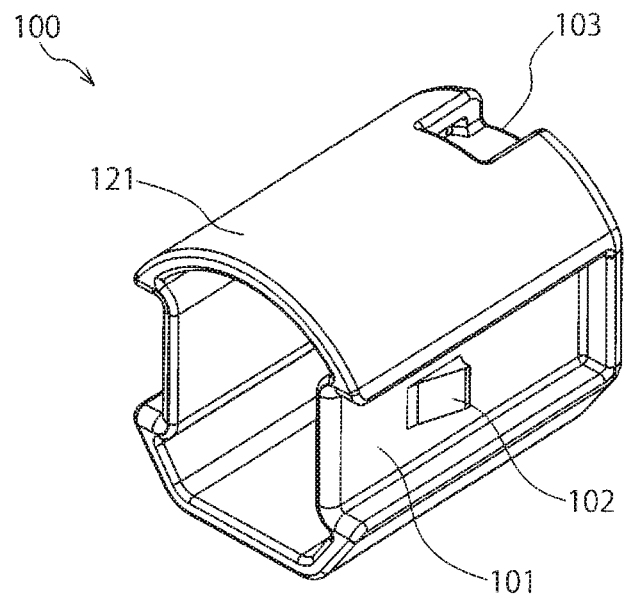
FIG. 17 is a perspective view of a cap.
Figure 18:
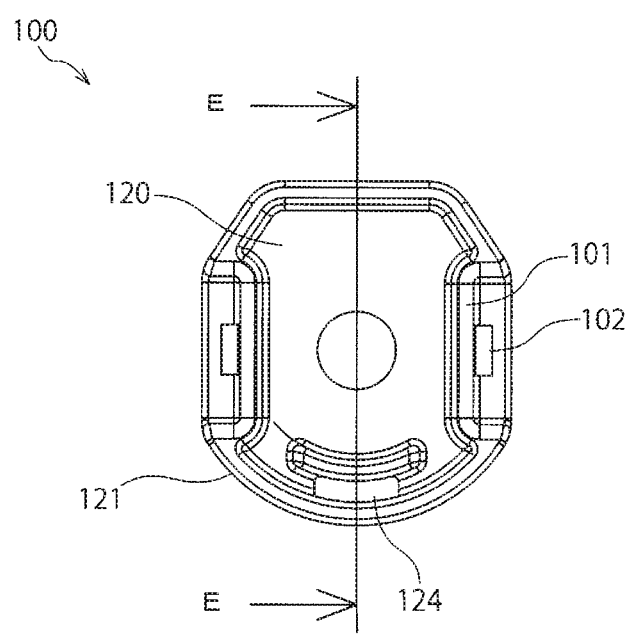
FIG. 18 is a left side view of the cap.
Figure 19:
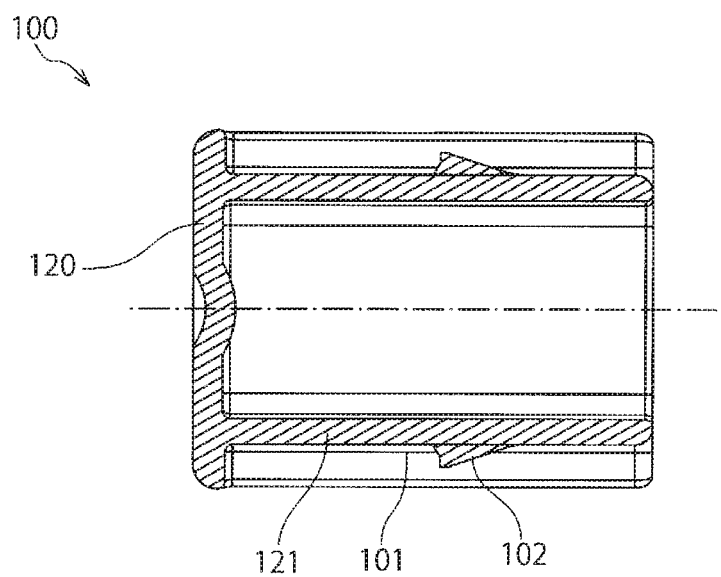
FIG. 19 is a horizontal cross-sectional view in FIG. 17.

As shown in FIG. 17 to FIG. 19, the pair of guide grooves 101 is located on side faces arranged back to back of the cap 100 having the cylindrical shape, and extends in a groove shape toward the later-described bottom portion 120 side from an opening end portion of the cap 100 having the cylindrical shape. As shown in FIG. 9, the pair of elastic pieces 96 of the case main member 90 is respectively inserted into the pair of guide grooves 101.

(Case Attachment Claws 102)

As shown in FIG. 17 to FIG. 19, the pair of case attachment claws 102 protrudes in the claw shape from the pair of guide grooves 101. When the elastic pieces 96 of the case main member 90 are inserted into the guide grooves 101, the pair of case attachment claws 102 fits into the cap attachment holes 97 thereof so as to prevent the cap 100 from coming off.

(Recessed Portion 103)

Figure 20:
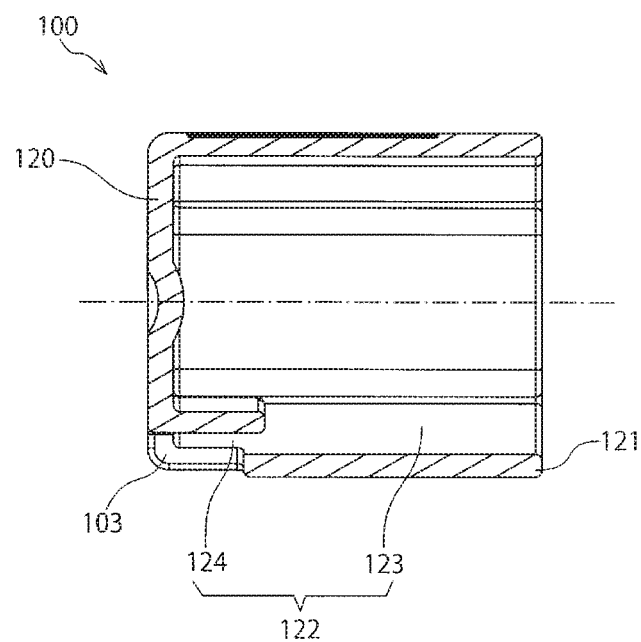
FIG. 20 is a cross-sectional view taken along a line E-E in FIG. 18.
Figure 21:
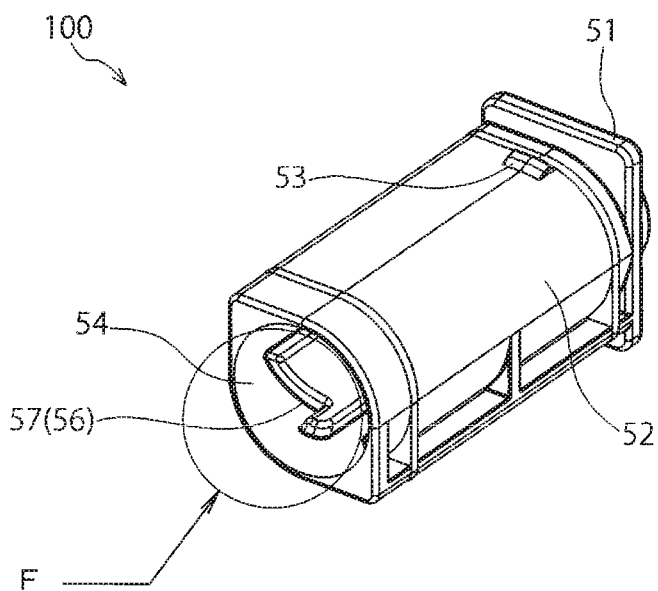
FIG. 21 is a perspective view of an inner portion.
Figure 22:
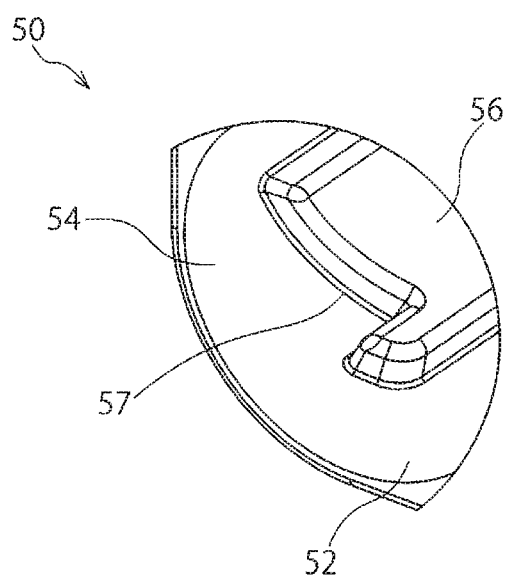
FIG. 22 is an enlarged view of an F portion in FIG. 21.
Figure 23:
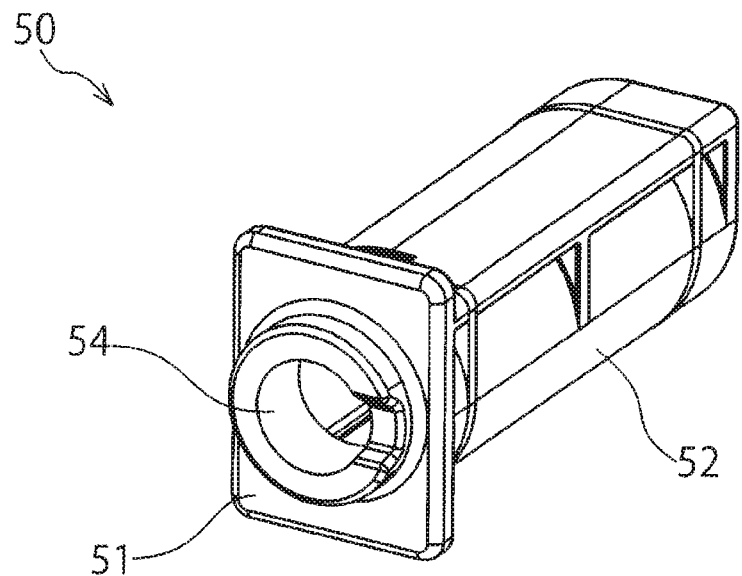
FIG. 23 is another perspective view of the inner portion.
Figure 24:
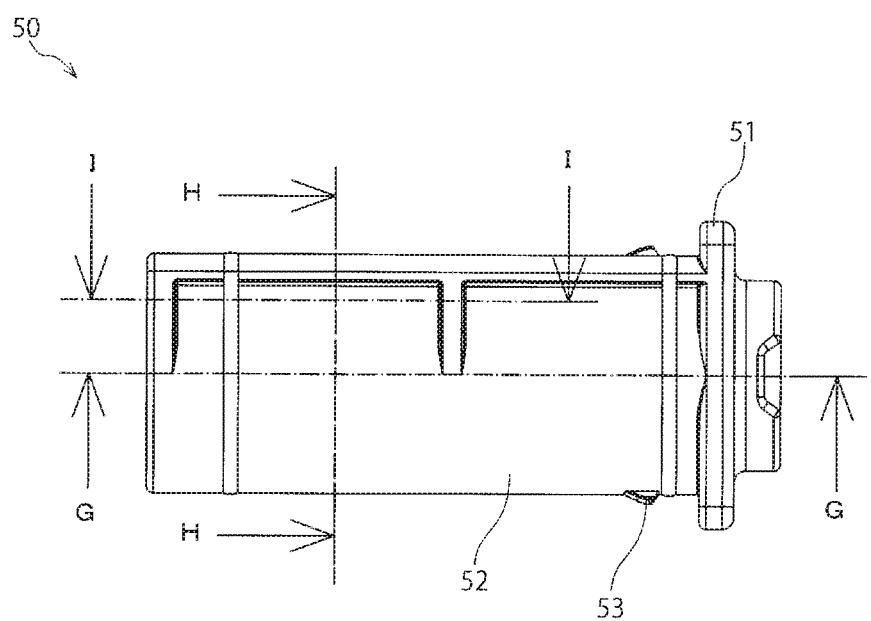
FIG. 24 is a front view of the inner portion.
Figure 25:
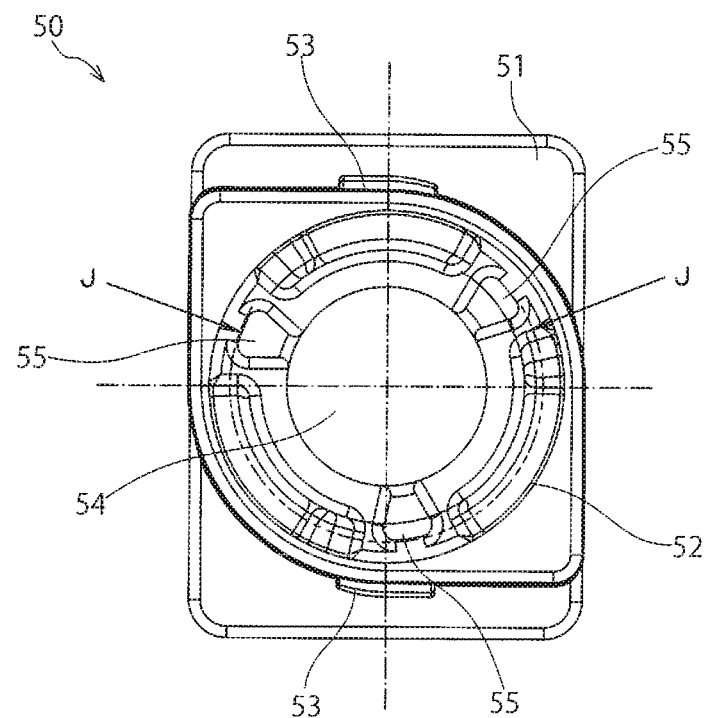
FIG. 25 is a left side view of the inner portion.
Figure 26:
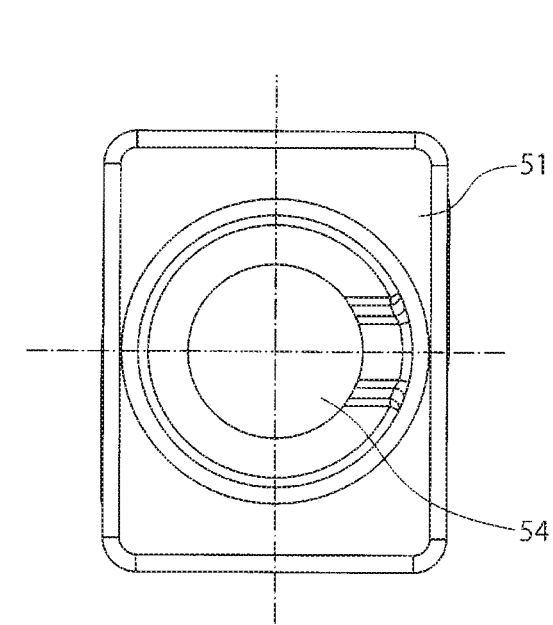
FIG. 26 is a right side view of the inner portion.
Figure 27:
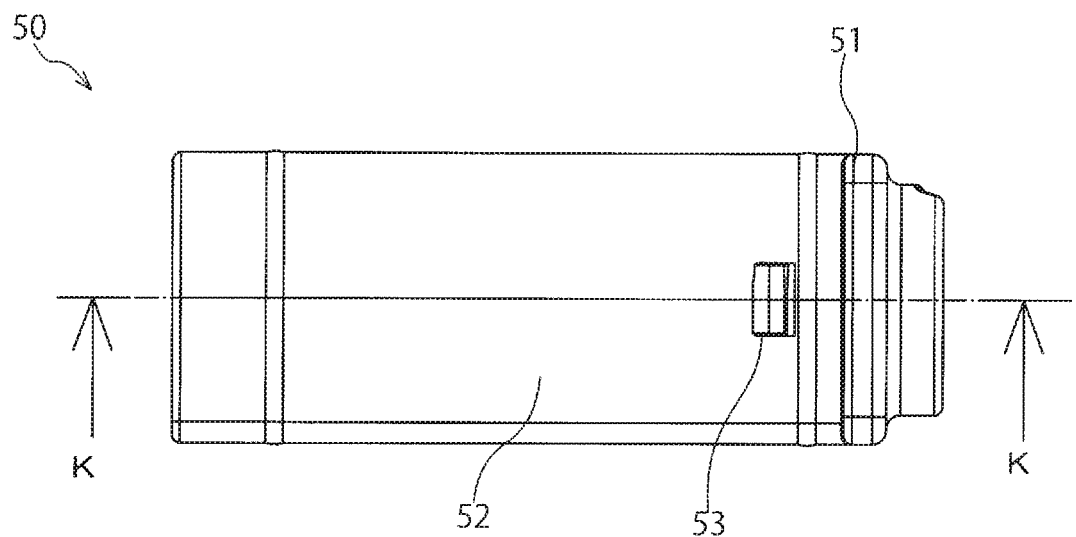
FIG. 27 is a bottom view of the inner portion.
Figure 28:
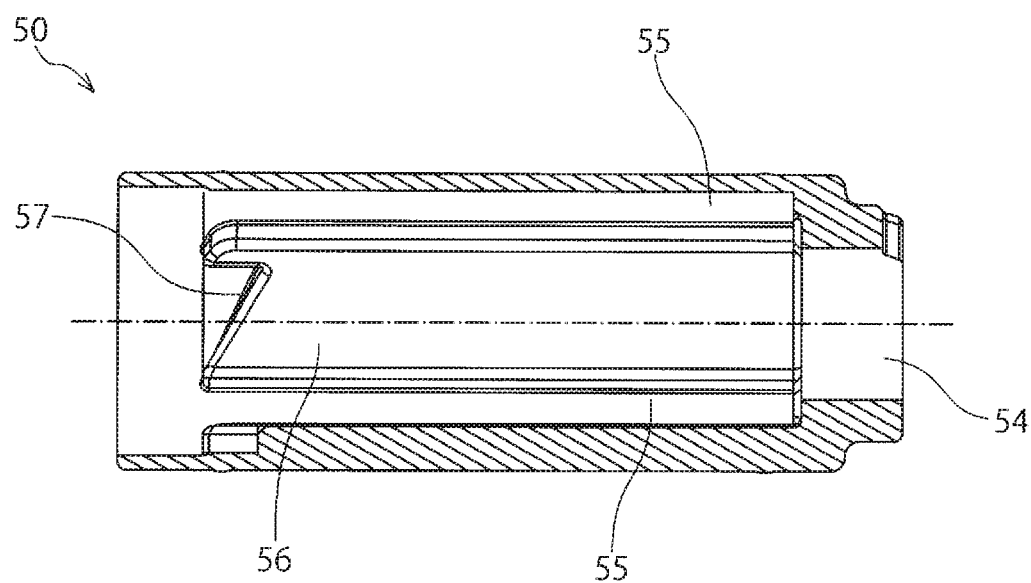
FIG. 28 is a cross-sectional view taken along a line G-G in FIG. 24.
Figure 29:
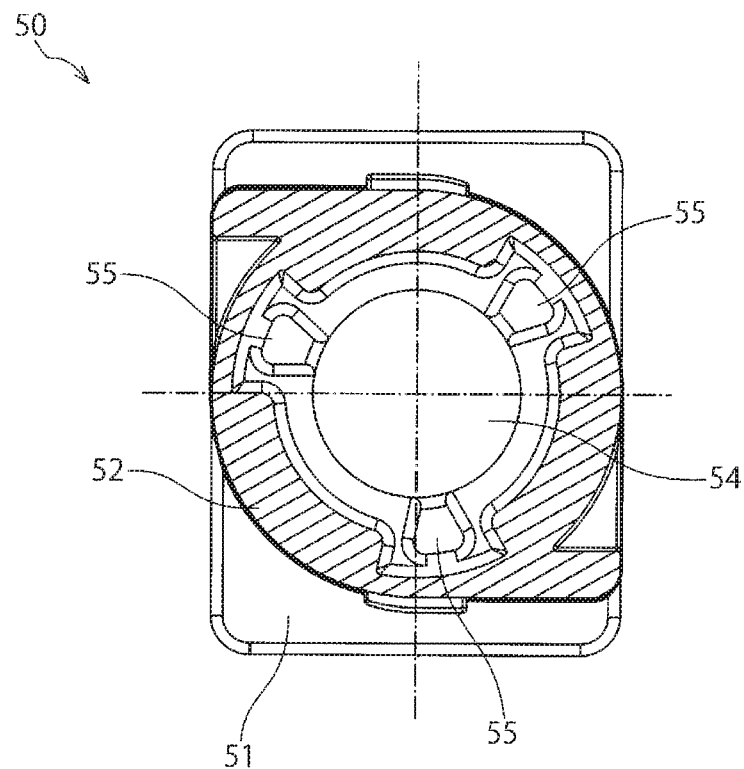
FIG. 29 is a cross-sectional view taken along a line H-H in FIG. 24.
Figure 30:
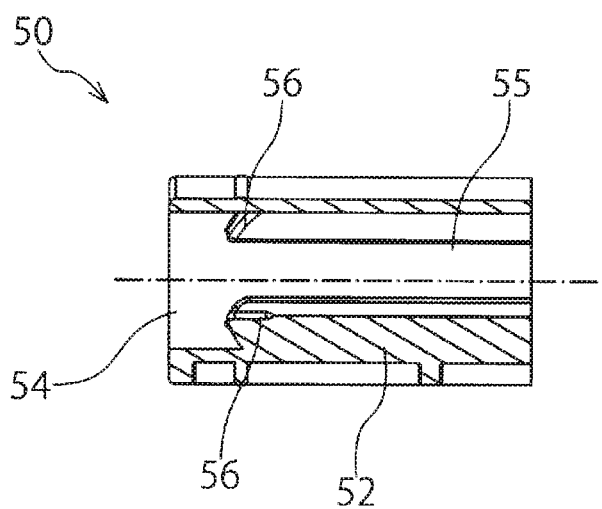
FIG. 30 is a cross-sectional view taken along a line I-I in FIG. 24.
Figure 31:
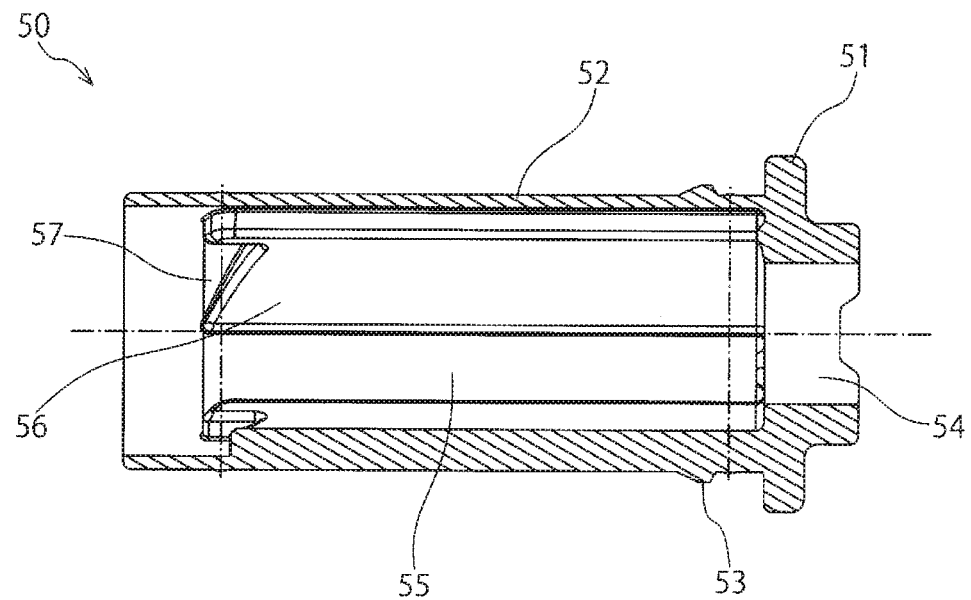
FIG. 31 is a cross-sectional view taken along a line K-K in FIG. 27.
Figure 32:
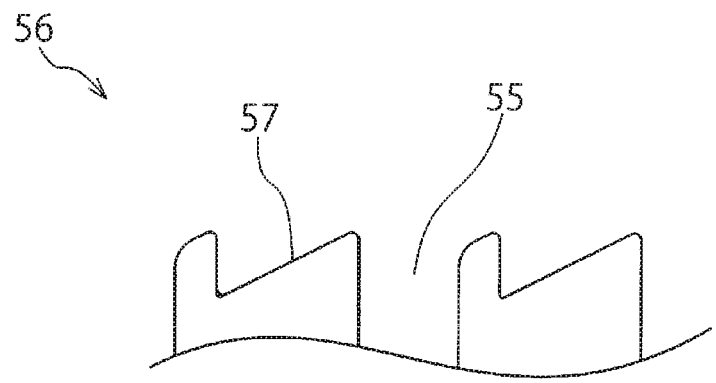
FIG. 32 is a cross-sectional view taken along a line J-J in FIG. 25.
Figure 33:
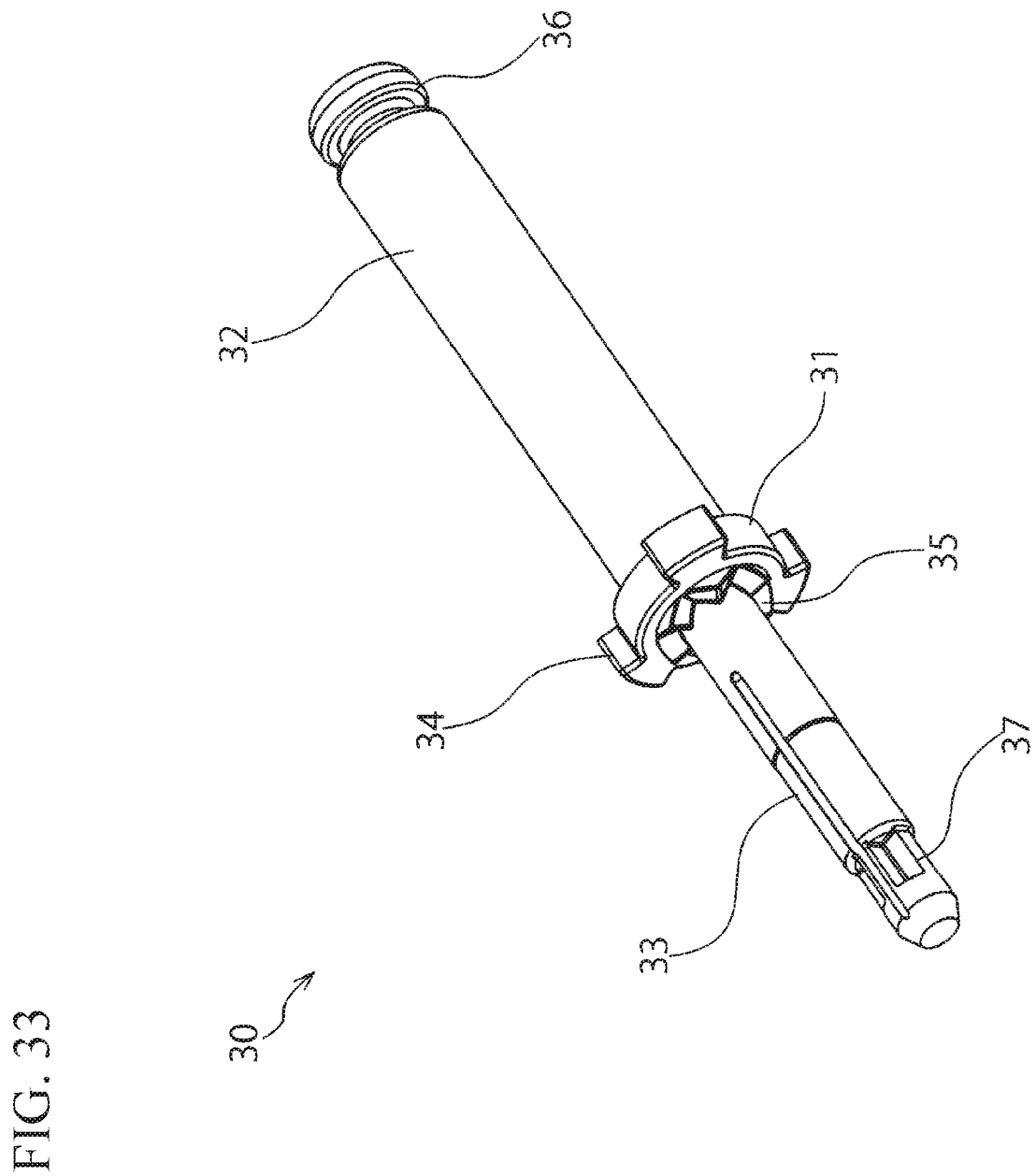
FIG. 33 is a perspective view of a push rod.
Figure 34:
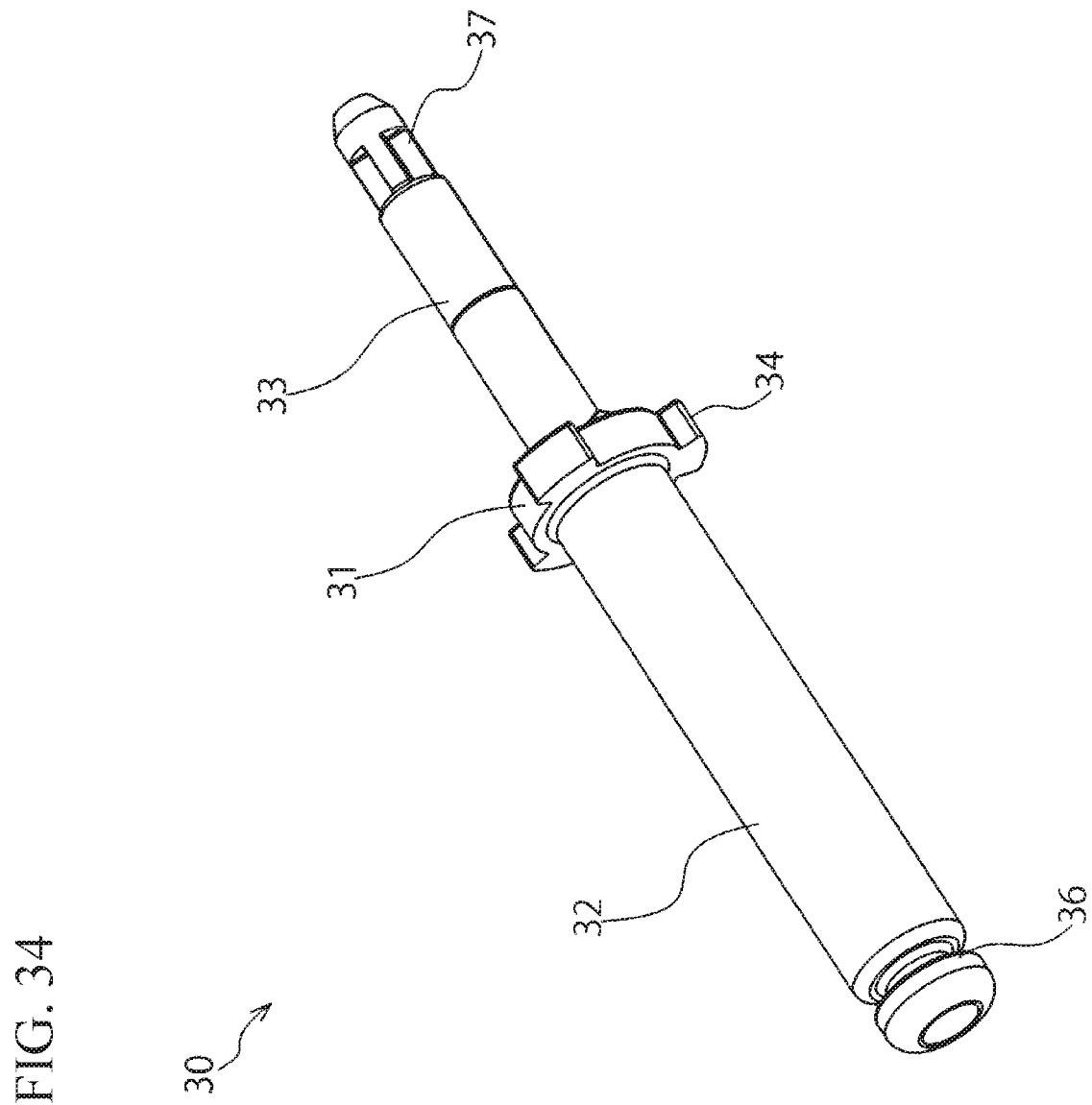
FIG. 34 is another perspective view of the push rod.
Figure 35:
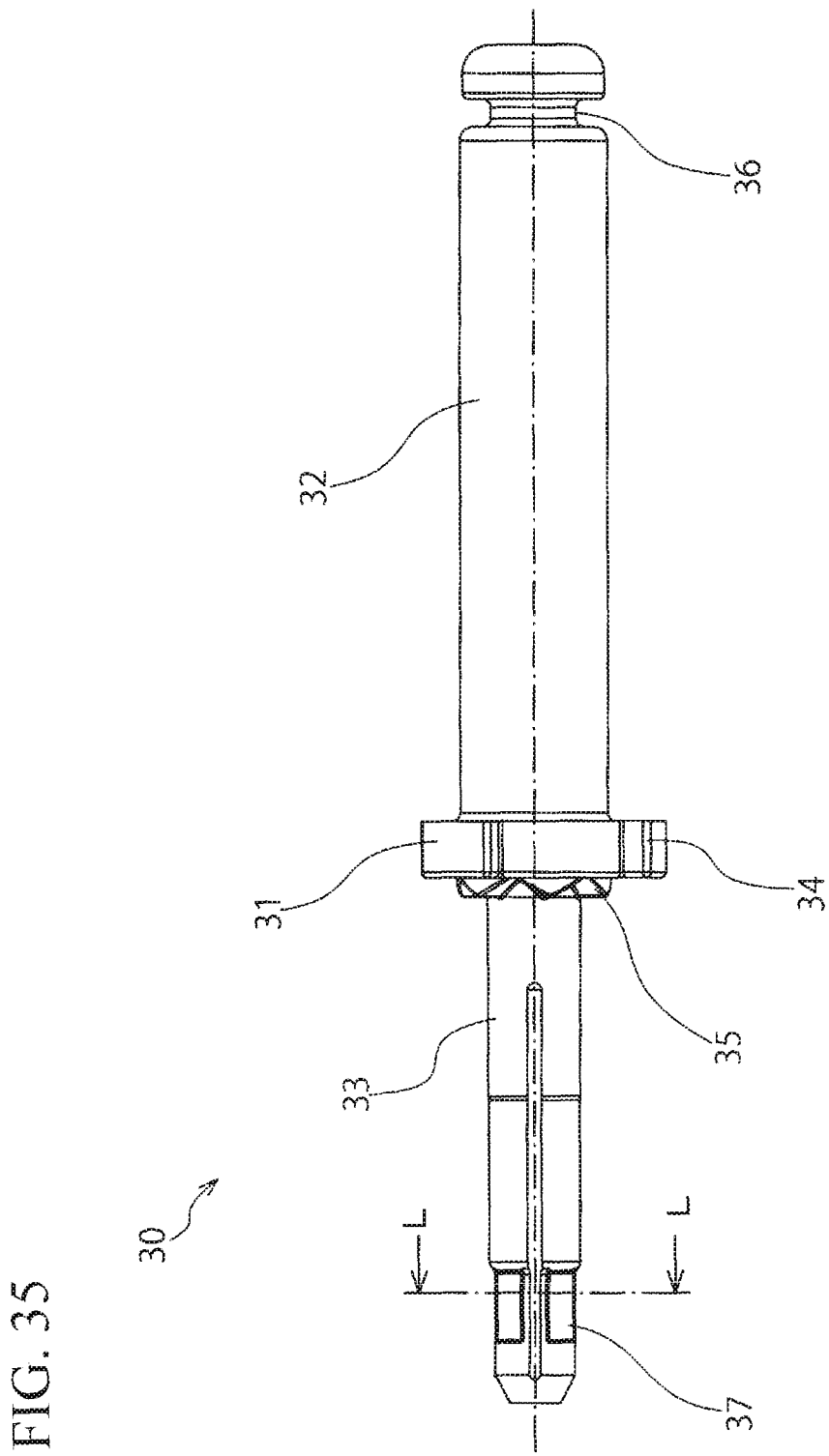
FIG. 35 is a front view of the push rod.
Figure 36:
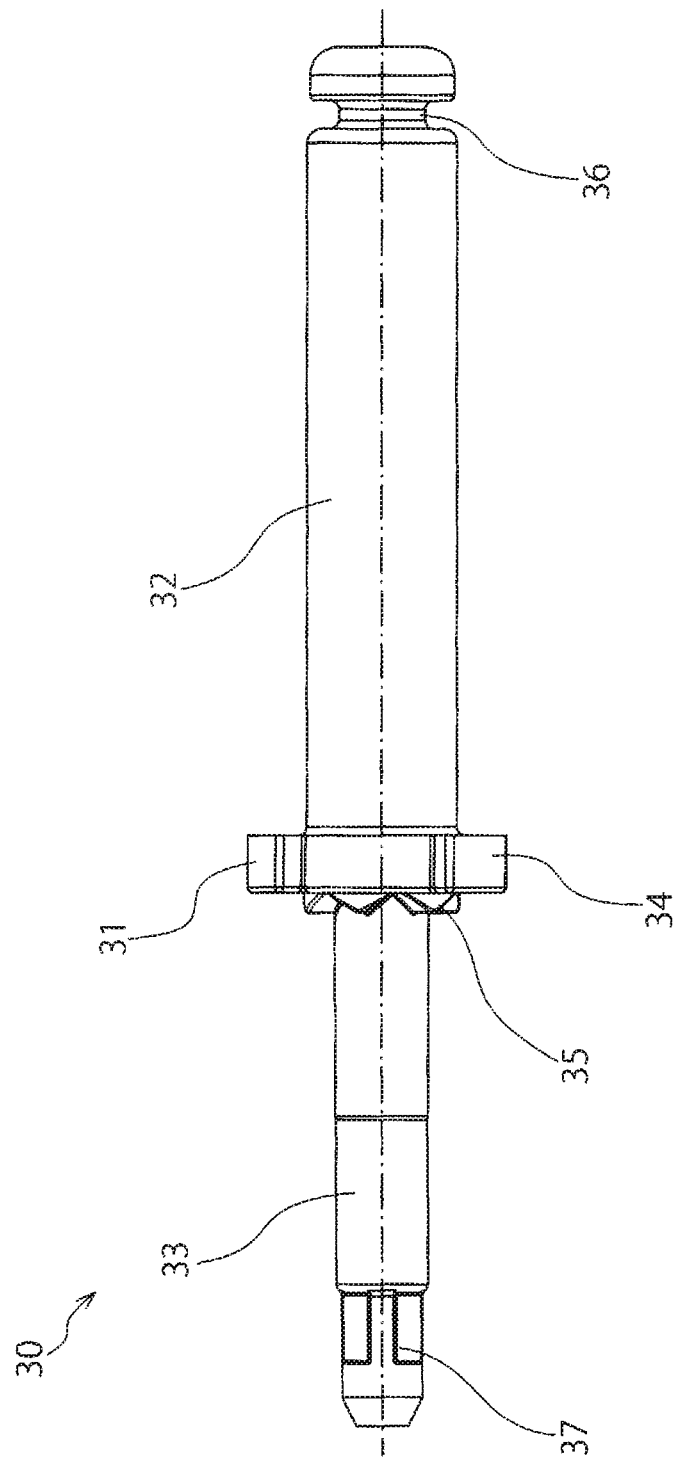
FIG. 36 is a plan view of the push rod.
Figure 37:
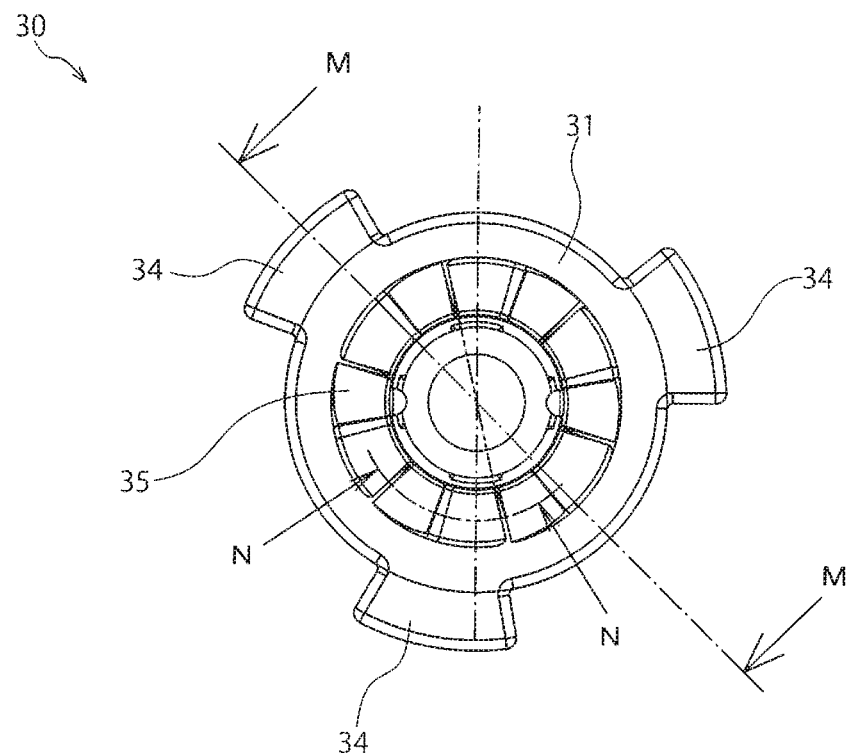
FIG. 37 is a left side view of the push rod.
Figure 38:
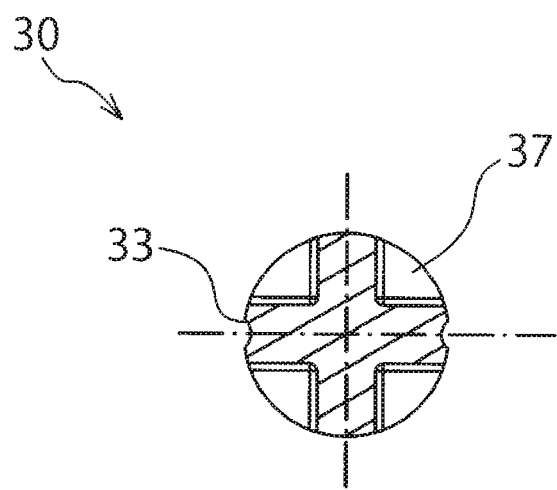
FIG. 38 is a cross-sectional view taken along a line L-L in FIG. 35.
Figure 39:
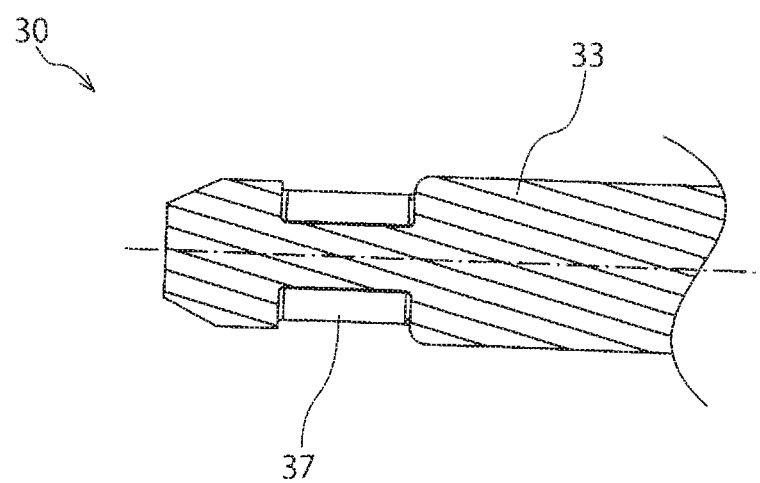
FIG. 39 is a cross-sectional view taken along a line M-M in FIG. 37.

As shown in FIG. 17, FIG. 18, and FIG. 20, the recessed portion 103 is provided at one portion by having a phase difference of 90 degrees different from the guide groove 101, is recessed from the later-described side portion 121, and is located adjacent the later-described bottom portion 120.

(Bottom Portion 120)

As shown in FIG. 1 and FIG. 20, the bottom portion 120 is located away from the bottom wall 111 by facing the bottom wall 111, and forms a first air flow channel 130 communicating with the air vent portion 114 between the bottom portion 120 and the bottom wall 111.

(Side Portion 121)

As shown in FIG. 1 and FIG. 20, the side portion 121 is located away from the inner peripheral wall 110 (peripheral wall) by continuing to the bottom portion 120, and has a cylindrical shape forming a second air flow channel (131) communicating with the first air flow channel 130 between the side portion 121 and the inner peripheral wall 110 (peripheral wall).

(Drainage Portion 122)

As shown in FIG. 1 and FIG. 20, in the attachment state of the case main member 90 (case 20) relative to the vehicle body side, the drainage portion 122 is located on the lower side, communicates with the second air flow channel 131, and opens toward the bottom portion 120.

Here, as shown in FIG. 1, the "attachment state of the case main member 90 (case 20) relative to the vehicle body side"

represents that the boot 80 side is located in the attachment upper direction a, and the case 20 side is located on the lower side.

For example, the boot 80 side is located on the upper side, the lower portion 95 side of the case 20 is attached in such a way so as to incline downwardly in the obliquely downward direction, and when the water enters into the case 20, as shown in FIG. 1, the boot 80 side is formed such that the water drains toward the water-flow downward direction b from the drainage portion 122.

As shown in FIG. 20, the drainage portion 122 is broadly formed by respective portions. Incidentally, the following (1) and (2) will be described later.

(1) Groove portion 123
(2) Opening portion 124

(Groove Portion 123)

As shown in FIG. 1 and FIG. 20, the groove portion 123 is concaved outwardly in the radial direction from an inner peripheral face of the side portion 121, and communicates with the second air flow channel 131.

(Opening Portion 124)

As shown in FIG. 1 and FIG. 20, the opening portion 124 opens toward the bottom portion 120 from the groove portion 123. The opening portion 124 opens at the recessed portion 103.

Then, in the drainage portion 122, as shown in FIG. 1, when the cap 100 is attached to the lower portion 95 of the case main member 90, the outer peripheral wall 113 of the case main member 90 protrudes into the groove portion 123 from above so as to drain the water toward the opening portion 124 from the groove portion 123 while meandering the water flowing through the second air flow channel 131 in the L shape in cross section.

(Push Rod 30)

Figure 13:
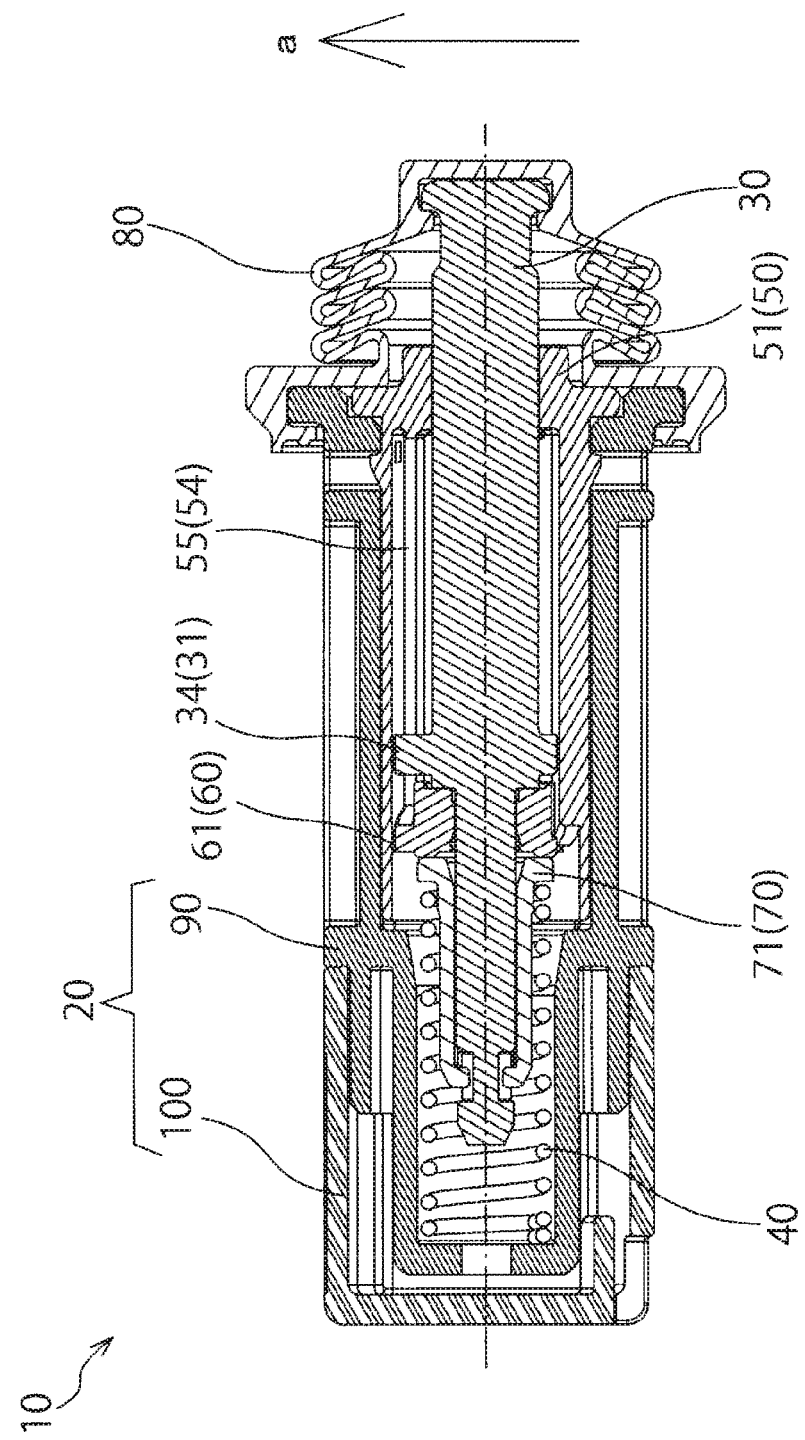
FIG. 13 is a cross-sectional view taken along a line D-D in FIG. 12.

As shown in FIG. 1, FIG. 3, and FIG. 13, the push rod 30 is slidably held inside the case 20, i.e. the case main member 90, and protrudes from the inside of the case 20 to push the fuel lid (not shown in the drawings) to open.

The push rod 30 is integrally formed by the thermoplastic synthetic resin having the moderate rigidity, for example, the POM.

As shown in FIG. 33 to FIG. 40, the push rod 30 comprises the following respective portions.

Incidentally, the following (1) to (7) will be described later.

(1) Intermediate convex portion 31
(2) Upper-side rod portion 32
(3) Lower-side rod portion 33
(4) Slide projections 34
(5) Fixed-side cam portion 35
(6) Boot-attachment concave portion 36
(7) Sleeve-attachment concave portions 37

(Intermediate Convex Portion 31)

As shown in FIG. 33 to FIG. 37, the intermediate convex portion 31 is located on in an axial direction of the push rod 30, and projects annularly in the radial direction.

(Upper-Side Rod Portion 32)

As shown in FIG. 33 to FIG. 36, the upper-side rod portion 32 extends in a column shape in the axial direction from the intermediate convex portion 31, and as shown in FIG. 1, when the upper-side rod portion 32 is inserted into the case main member 90 through the inner portion 50, the upper-side rod portion 32 protrudes to an outside from an inside of the case main member 90.

(Lower-Side Rod Portion 33)

As shown in FIG. 33 to FIG. 36, the lower-side rod portion 33 extends in the column shape from the intermediate convex portion 31 in a direction opposite to the upper-side rod portion 32 in the radial direction. The lower-side rod portion 33 is formed in the column shape thinner than the upper-side rod portion 32, and as shown in FIG. 1, the lower-side rod portion 33 is inserted into the case main member 90 through the inner portion 50, and is located inside the case main member 90.

(Slide Projections 34)

As shown in FIG. 33 to FIG. 37, a plurality of slide projections 34, for example, three slide projections 34, radially protrudes from the intermediate convex portion 31 at equal intervals. As shown in FIG. 1, when the push rod 30 is inserted into the inner portion 50, the three slide projections 34 fit into the later-described slide grooves 55 so as to prevent a rotation of the push rod 30 inside the inner portion 50.

(Fixed-Side Cam Portion 35)

Figure 40:
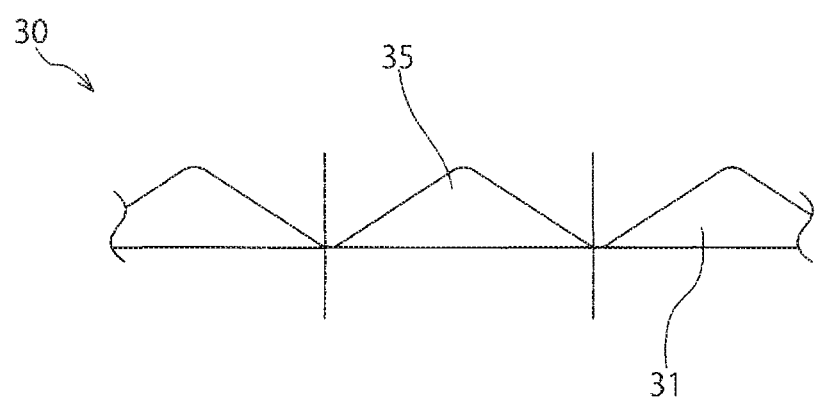
FIG. 40 is a cross-sectional view taken along a line N-N in FIG. 37.
Figure 41:
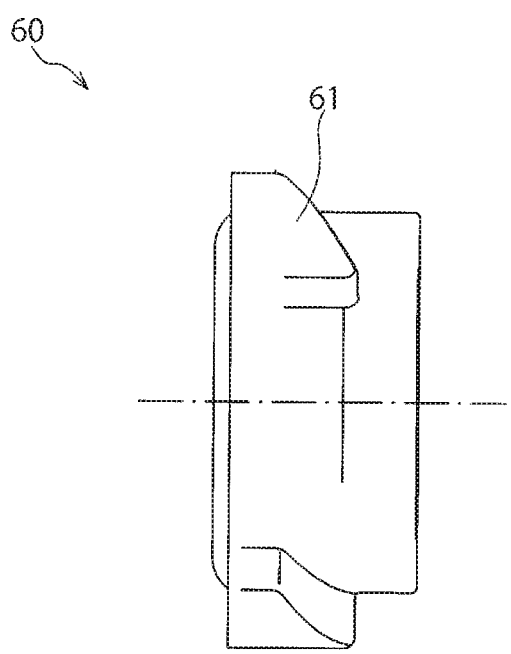
FIG. 41 is a front view of a cam.
Figure 42:
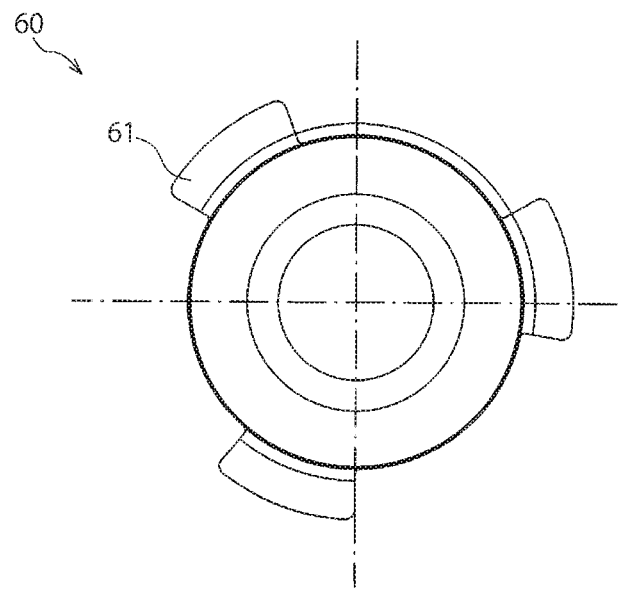
FIG. 42 is a left side view of the cam.

As shown in FIG. 33 to FIG. 37, the fixed-side cam portion 35 is located on a lower face of the intermediate convex portion 31, and inside the case main member 90, the fixed-side cam portion 35 engages a movable-side cam portion 62 of the rotating cam 60. As shown in FIG. 40, the fixed-side cam portion 35 is formed in such a way so as to form triangles having one tooth with an obtuse angle in a waveform continuous along a circumferential direction of the intermediate convex portion 31.

(Boot-Attachment Concave Portion 36)

As shown in FIG. 33 to FIG. 36, the boot-attachment concave portion 36 is located at a tip portion of the lower-side rod portion 33, and is formed in a concave shape concaved annularly. As shown in FIG. 1, the later-described rod-attachment convex portion 81 of the boot 80 fits into the boot-attachment concave portion 36 so as to fix the boot 80 relative to the push rod 30.

(Sleeve-Attachment Concave Portions 37)

As shown in FIG. 33 to FIG. 36, FIG. 38, and FIG. 39, the sleeve-attachment concave portions 37 are located at the tip portion of the lower-side rod portion 33, and the tip portion is formed in a cross shape in cross section so as to form a plurality of concave portions, for example, four concave portions, concaved in a triangular shape on a circumference thereof. As shown in FIG. 1, rod attachment claws 74 of the sleeve 70 fit into the sleeve-attachment concave portions 37 inside the case main member 90 so as to fix the sleeve 70 relative to the push rod 30.

(Spring 40)

As shown in FIG. 1 and FIG. 3, the spring 40 is located inside the case 20, i.e. inside the case main member 90 for urging the push rod 30 toward a forward-movement position protruding from the inside of the case 20, and forms the urging device.

The spring 40 is formed by a stainless steel wire for spring.

As shown in FIG. 1 and FIG. 13, the spring 40 is compressed between the bottom wall 111 thereof and the later-described projecting edge portion 71 of the sleeve 70 inside the case main member 90.

(Inner Portion 50)

As shown in FIG. 1, FIG. 3, and FIG. 21 to FIG. 32, the inner portion 50 is located inside the case 20, i.e. inside the case main member 90 for slidably holding the push rod 30.

The inner portion 50 is integrally formed by the thermoplastic synthetic resin having the moderate rigidity, for example, the POM.

As shown in FIG. 21 to FIG. 32, the inner portion 50 comprises the following respective portions.

Incidentally, the following (1) to (7) will be described later.

(1) Lid portion 51
(2) Cylindrical portion 52
(3) Case-attachment claws 53
(4) Through-hole 54
(5) Slide grooves 55
(6) Lock portions 56 (lock device)
(7) Locking groove 57

(Lid Portion 51)

As shown in FIG. 21, and FIG. 23 to FIG. 26, the lid portion 51 projects in a rectangular shape from one end portion, and as shown in FIG. 1, the lid portion 51 overlaps with the flange portion 91 of the case main member 90.

(Cylindrical Portion 52)

As shown in FIG. 21, and FIG. 23 to FIG. 26, the cylindrical portion 52 extends in a cylindrical shape from the lid portion 51, and as shown in FIG. 1, the cylindrical portion 52 fits into the case main member 90.

(Case-Attachment Claws 53)

As shown in FIG. 21, FIG. 24, FIG. 25, FIG. 27, and FIG. 31, a pair of case-attachment claws 53 projects from side faces arranged back to back of the cylindrical portion 52 in the claw shape. When the inner portion 50 fits into the case main member 90, the case-attachment claws 53 fit into the inner attachment holes 94 thereof so as to unrotatably fix the inner portion 50 into the case main member 90.

(Through-Hole 54)

As shown in FIG. 21 to FIG. 23, FIG. 25, FIG. 26, and FIG. 28 to FIG. 31, the through-hole 54 passes through the cylindrical portion 52 from the lid portion 51 in a cylindrical shape. As shown in FIG. 1, the push rod 30 and the rotating cam 60 are slidably held inside the through-hole 54.

(Slide Grooves 55)

As shown in FIG. 25, and FIG. 28 to FIG. 31, a plurality of slide grooves 55, for example, three slide grooves 55, is formed in the concave shape radially outwardly in the radial direction from an inner peripheral face of the through-hole 54. The three slide projections 34 of the push rod 30 inserted to pass through the through-hole 54 slidably fit into the three slide grooves 55 so as to prevent the rotation of the push rod 30 inside the inner portion 50. Also, three engagement projections 61 of the rotating cam 60 inserted to pass through the through-hole 54 slidably fit into the three slide grooves 55 so as to prevent the rotation of the rotating cam 60 inside the through-hole 54.

(Lock Portions 56)

As shown in FIG. 21, FIG. 22, and FIG. 28 to FIG. 32, the lock portions 56 are located at an opening end portion of the through-hole 54, and are formed in the claw shape between adjacent slide grooves 55, and a plurality of lock portions 56, for example, a total of three lock portions 56, is formed inside intervals of the three slide grooves 55. In a state wherein the rotating cam 60 protrudes downwardly from the inside of the through-hole 54, the later-described engagement projections 61 thereof engage the lock portions 56 so as to prevent the rotation of the rotating cam 60 relative to the inside of the inner portion 50, so that, as shown in FIG. 13, the spring 40 is compressed, and it comes to a state wherein the push rod 30 is shortened so as to form the "lock device".

The "lock device" is formed by the later-described engagement projections 61 of the rotating cam 60 in addition to the lock portions 56 of the inner portion 50. Here, as shown in FIG. 1 and FIG. 3, the "lock device" is located between the case 20 and the push rod 30, and is for locking the push rod 30 in a backward-movement position of the case 20 as shown in FIG. 13 by pushing the push rod 30 against an urging force of the spring 40 (urging device).

In the "lock device", a state wherein the engagement projections 61 fit into the later-described locking groove 57 of the lock portion 56 becomes a locked state (see FIG. 13), and a state wherein the engagement projections 61 are disengaged from the locking groove 57 becomes the unlocked state (see FIG. 1).

(Locking Groove 57)

Figure 57:
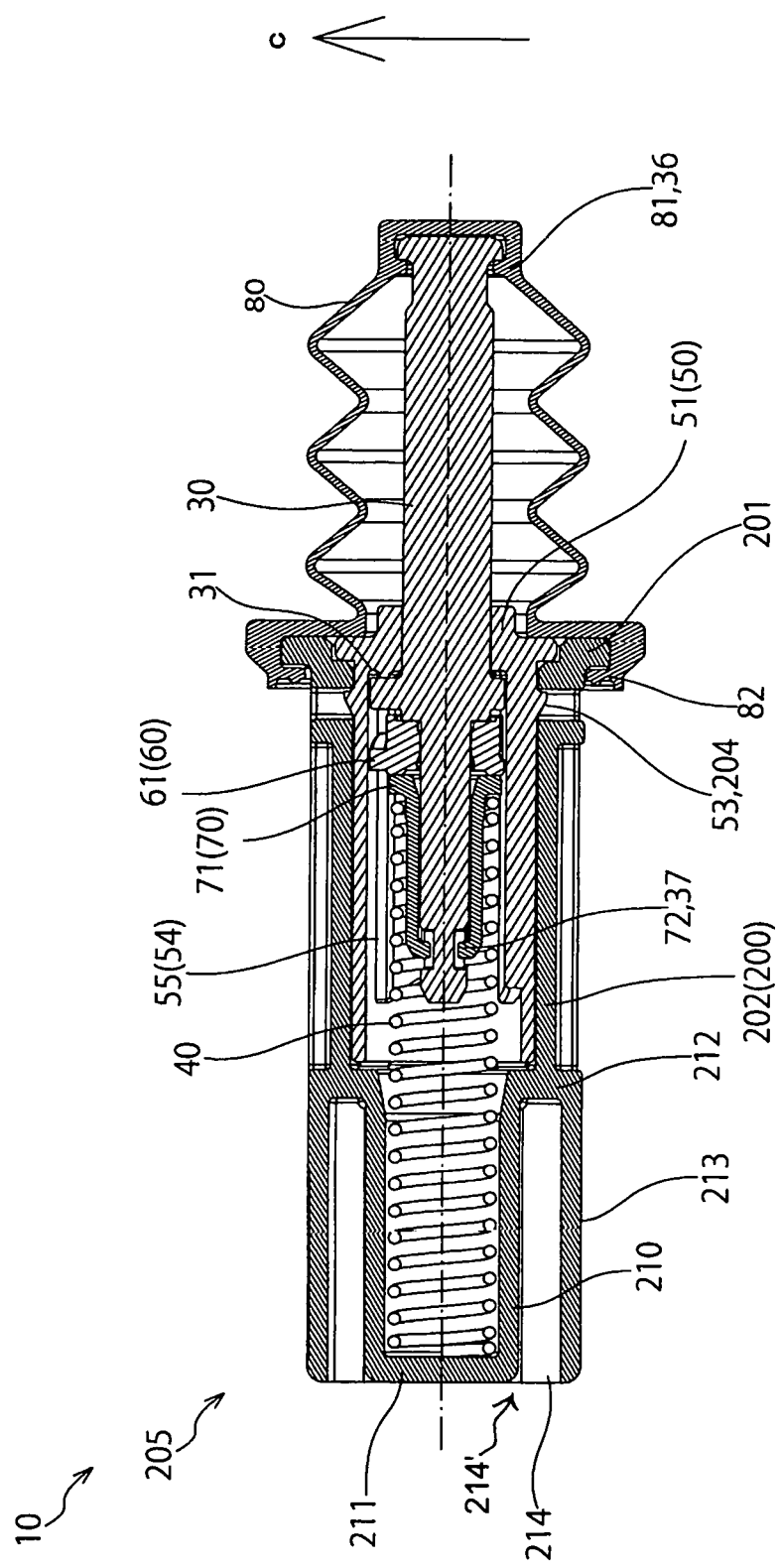
FIG. 57 is a cross-sectional view taken along a line Q-Q in FIG. 54.

The locking groove 57 is located on a middle of the lock portion 56, and as shown in FIG. 21, FIG. 22, FIG. 28, and FIG. 30 to FIG. 32, the locking groove 57 is formed in the concave shape. The later-described engagement projections 61 of the rotating cam 60 fit into the locking groove 57 so as to become the locked state. As shown in FIG. 57, the locking groove 57 projects in a right-angled triangle shape along a rotation direction of the rotating cam 60, and is formed by an inclined face leading to the locking groove 57, and a vertical face rising vertically from a bottom of the inclined face.

(Rotating Cam 60)

As shown in FIG. 1, FIG. 3, and FIG. 41 to FIG. 45, the rotating cam 60 is formed in a circular ring shape such that the rotating cam 60 is inserted to pass through the lower-side rod portion 33 of the push rod 30, and the movable-side cam portion 62 thereof engages the fixed-side cam portion 35 of the intermediate convex portion 31.

The rotating cam 60 is integrally formed by the thermoplastic synthetic resin having the moderate rigidity, for example, the POM.

As shown in FIG. 41 to FIG. 45, the rotating cam 60 comprises the following respective portions.

Incidentally, the following (1) and (2) will be described later.

(1) Engagement projections 61
(2) Movable-side cam portion 62

(Engagement Projections 61)

As shown in FIG. 41 to FIG. 45, a plurality of engagement projections 61, for example, three engagement projections 61 extend radially from an outer periphery of the rotating cam 60, and include an inclined face in front in the rotation direction of the rotating cam 60 so as to form the "lock device" together with the lock portion 56 of the inner portion 50.

As shown in FIG. 1, the three engagement projections 61 fit into the three slide grooves 55 of the inner portion 50 so as to prevent the rotation of the rotating cam 60 inside the through-hole 54. Then, when the rotating cam 60 protrudes downwardly through the through-hole 54 of the inner portion 50, the rotating cam 60 becomes rotatable. In a state wherein the rotating cam 60 protrudes downwardly through the through-hole 54 of the inner portion 50, the engagement projections 61 fit into the locking groove 57 of the inner portion 50, so that the rotation of the rotating cam 60 is prevented relative to the inner portion 50, or the rotating cam 60 maintains a protruding state, so that the "lock device" becomes the locked state.

(Movable-Side Cam Portion 62)

Figure 43:
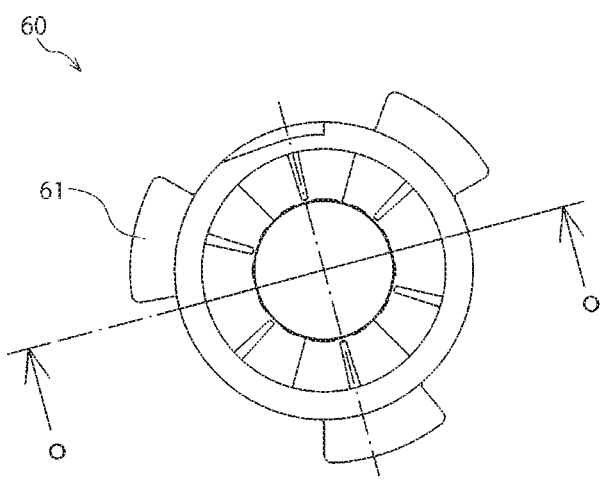
FIG. 43 is a right side view of the cam.
Figure 44:
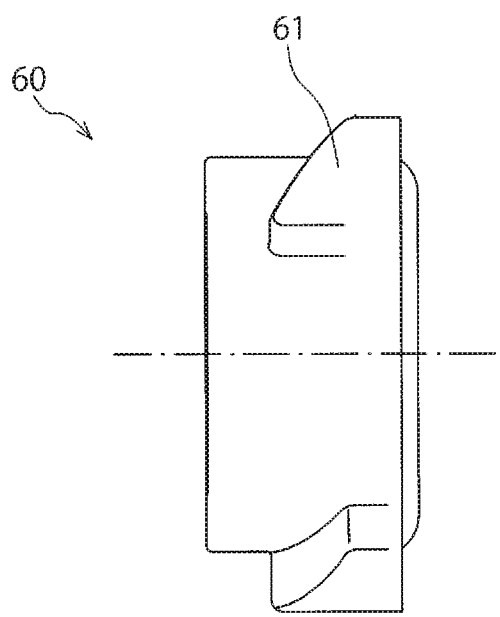
FIG. 44 is a rear view of the cam.
Figure 45:
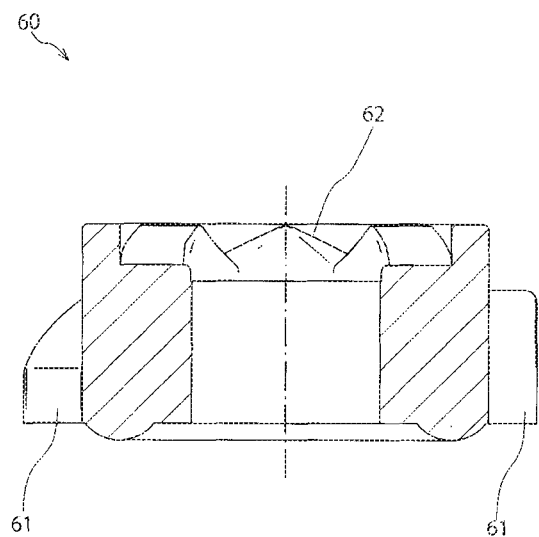
FIG. 45 is a cross-sectional view taken along a line O-O in FIG. 43.

As shown in FIG. 43 and FIG. 45, the movable-side cam portion 62 is located on an upper face of the rotating cam 60, and engages the fixed-side cam portion 35 of the push rod 30. The movable-side cam portion 62 is formed in a shape supplemental to the fixed-side cam portion 35 in such a way so as to form triangles having one tooth with an obtuse angle in a waveform continuous along the circumferential direction of the intermediate convex portion 31.

(Sleeve 70)

As shown in FIG. 1, FIG. 3, and FIG. 46 to FIG. 49, the sleeve 70 is inserted to pass through the lower-side rod portion 33 of the push rod 30 so as to prevent the rotating cam 60 previously inserted to pass through the lower-side rod portion 33, and to horizontally press the movable-side cam portion 62 of the rotating cam 60 toward the fixed-side cam portion 35 of the intermediate convex portion 31.

The sleeve 70 is integrally formed by the thermoplastic synthetic resin having the moderate elasticity and rigidity, for example, the POM.

As shown in FIG. 46 to FIG. 49, the sleeve 70 comprises the following respective portions.

Incidentally, the following (1) to (4) will be described later.

---

(1) Projecting edge portion 71
(2) Main member portion 72
(3) Slits 73
(4) Rod-attachment claws 74

---

(Projecting Edge Portion 71)

As shown in FIG. 46 to FIG. 49, the projecting edge portion 71 projects annularly. As shown in FIG. 1, in the projecting edge portion 71, inside the case main member 90, an upper face thereof abuts against a lower face of the rotating cam 60, and a lower face abuts against the spring 40.

(Main Member Portion 72)

Figure 46:
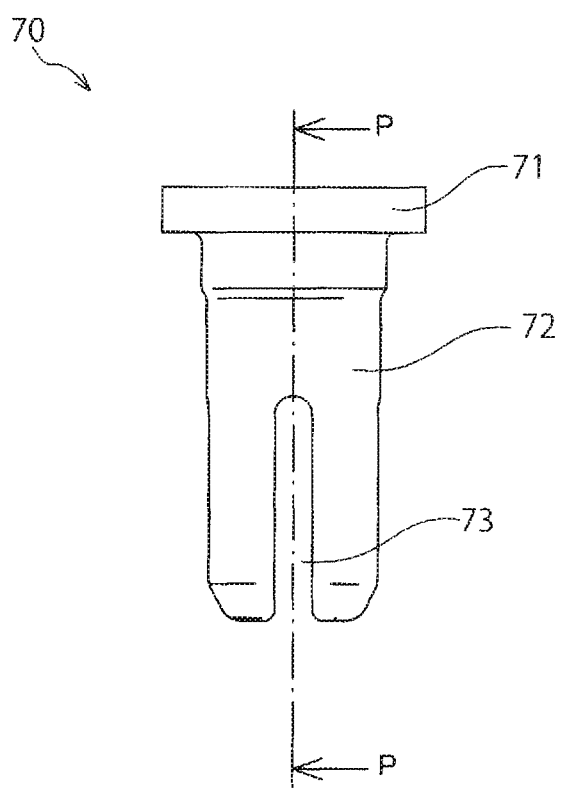
FIG. 46 is a front view of a sleeve.
Figure 47:
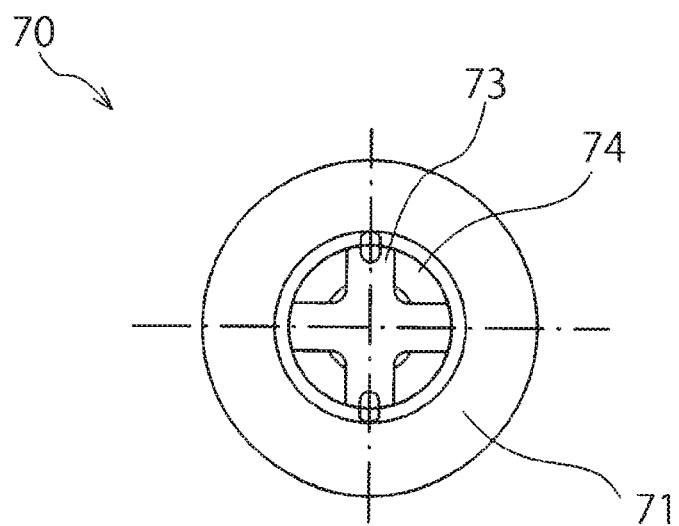
FIG. 47 is a plan view of the sleeve.
Figure 48:
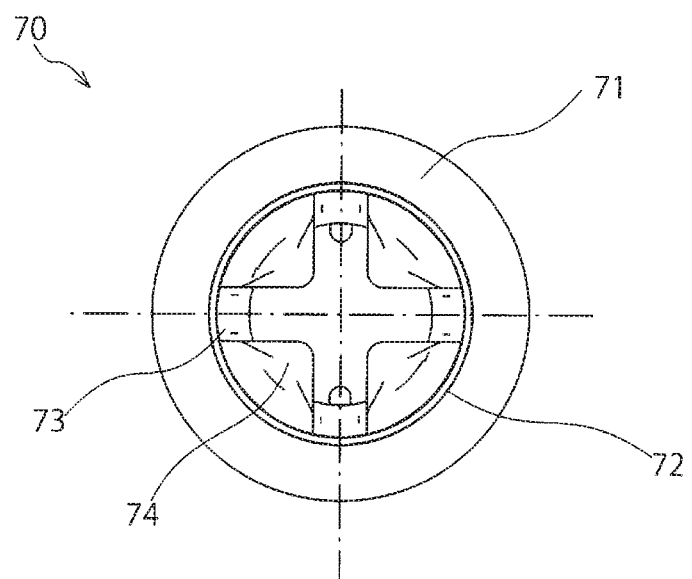
FIG. 48 is a bottom view of the sleeve.
Figure 49:
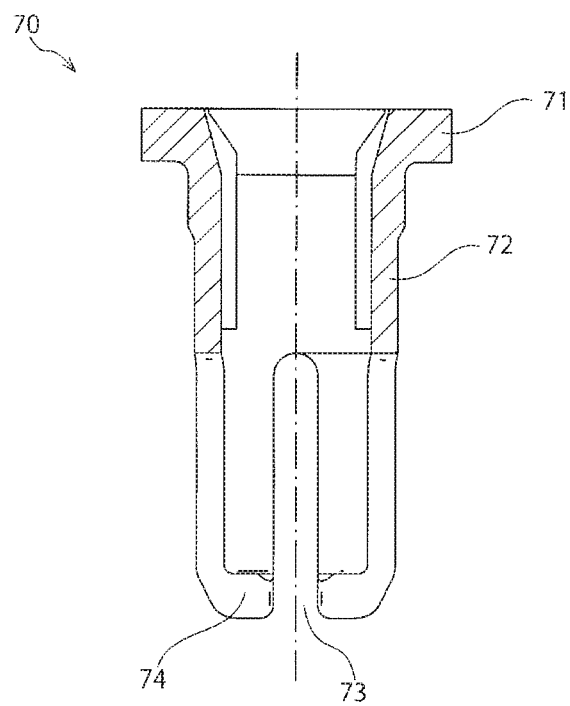
FIG. 49 is a cross-sectional view taken along a line P-P in FIG. 46.

As shown in FIG. 46, FIG. 48, and FIG. 49, the main member portion 72 extends in the cylindrical shape from the lower face of the projecting edge portion 71, and as shown in FIG. 1, the main member portion 72 is inserted to pass through the lower-side rod portion 33 of the push rod 30.

(Slits 73)

As shown in FIG. 46, FIG. 48, and FIG. 49, the slits 73 divide a tip portion of the main member portion 72 having the cylindrical shape into a plurality of numbers, for example, four.

(Rod-Attachment Claws 74)

As shown in FIG. 46 to FIG. 49, the rod-attachment claws 74 are located inside intervals divided by the four slits 73, and protrude in the claw shape inwardly in the radial direction. A total of four rod-attachment claws 74 respectively fits into the four sleeve-attachment concave portions 37 of the lower-side rod portion 33 inserted to pass through the inside of the main member portion 72 so as to prevent a movement in the axial direction and rotation of the lower-side rod portion 33.

(Boot 80)

As shown in FIG. 1 to FIG. 3, FIG. 10 to FIG. 13, and FIG. 50, the boot 80 extendably covers the upper-side rod portion 32 of the push rod 30 protruding from the inside of the case 20, i.e. the inside of the case main member 90, and is attached to the case main member 90. The boot 80 is formed in an accordion shape wherein one end portion is formed in a tapered manner and is closed, and the other end portion opens.

The boot 80 is integrally formed by the thermoplastic synthetic resin having the moderate elasticity and rigidity, for example, a synthetic rubber.

The boot 80 comprises the following respective portions.

Incidentally, the following (1) and (2) will be described later.

---

(1) Rod-attachment convex portion 81
(2) Case-attachment convex portion 82

---

(Rod-Attachment Convex Portion 81)

Figure 50:
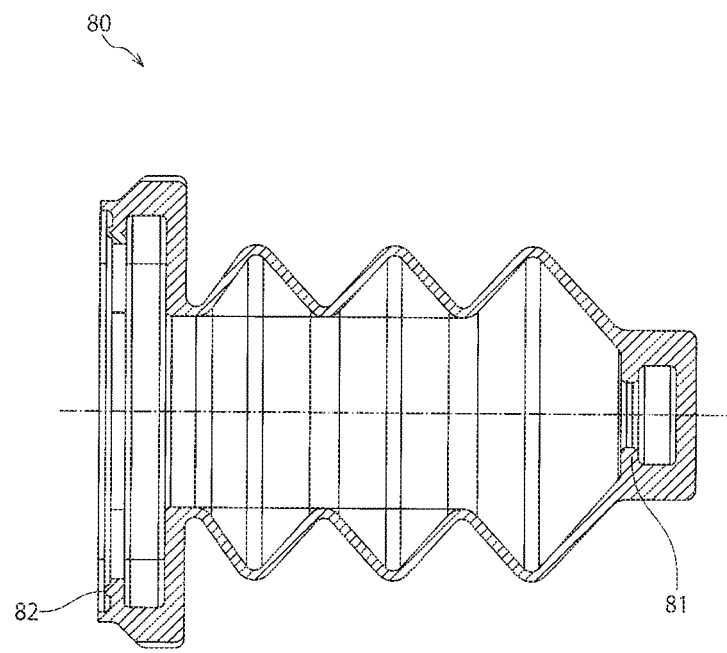
FIG. 50 is a horizontal cross-sectional view of a boot.

As shown in FIG. 50, the rod-attachment convex portion 81 is located inside the tip portion formed in the tapered manner and closed, and protrudes annularly from the inner face. As shown in FIG. 1, the rod-attachment convex portion 81 elastically fits into the boot-attachment concave portion 36 of the push rod 30 so as to prevent the push rod 30 from coming out of the boot 80.

(Case-Attachment Convex Portion 82)

As shown in FIG. 50, the case-attachment convex portion 82 is located on an inner peripheral face of an opening edge portion which is open, and protrudes annularly from the inner peripheral face. As shown in FIG. 1, when the opening edge portion of the boot 80 is covered in such a way so as to cover the flange portion 91 of the case main member 90, the case-attachment convex portion 82 is caught on a lower face of the flange portion 91 so as to fix the boot 80 relative to the case main member 90. In an attachment state of the boot 80, the boot 80 covers the flange portion 91 of the case main member 90 so as to prevent the water from entering into the case main member 90.

(Extended State of the Push Lifter 10)

Next, an extending-and-shortening operation of the push lifter 10 in an assembly state comprising the aforementioned structures will be explained. First, in the extended state of the push lifter 10, the lock device is in the unlocked state, and as shown in FIG. 1, the intermediate convex portion 31 of the push rod 30 is pushed by the urging force of the spring 40 inside the case main member 90 through the sleeve 70 and the rotating cam 60, and the upper-side rod portion 32 protrudes from the case main member 90.

The upper-side rod portion 32 protrudes so as to push the fuel lid (not shown in the drawings) to open through the boot 80. Consequently, the fuel lid (not shown in the drawings) which has pushed to open can be manually opened.

(Shortened State of the Push Lifter 10)

In contrast, in order to transfer the push lifter 10 from the extended state to the shortened state, the push rod 30 may be pushed into the case main member 90 through the fuel lid (not shown in the drawings) or directly against the urging force of the spring 40 (urging device). When the push rod 30 is pushed in, the intermediate convex portion 31 thereof and the rotating cam 60 move backward toward a back inside the through-hole 54 of the inner portion 50. When the rotating cam 60 moves backward toward the back inside the through-hole 54, the rotating cam 60 comes out of the through-hole 54 so as to become rotatable.

At that time, by an engagement between the movable-side cam portion 62 of the rotating cam 60 and the fixed-side cam portion 35 of the push rod 30, the rotating cam 60 rotates, and the engagement projection 61 thereof reaches the lock portion 56 of the inner portion 50. In that state, when a force of pushing the push rod 30 in is released, the rotating cam 60 is pushed back by the urging force of the spring 40 (urging device) through the sleeve 70 so as to move forward, so that the engagement projection 61 thereof fits into the locking groove 57 of the lock portion 56, and the lock device becomes the locked state. Consequently, the urging force of the spring 40 (urging device) is received by the lock portion 56 of the inner portion 50, and as shown in FIG. 13, the push lifter 10 maintains the shortened state.

(Release of the Locked State of the Lock Device)

In order to extend the push lifter 10 again, the push rod 30 may be slightly pushed toward the inside of the case main member 90 through the fuel lid (not shown in the drawings) or directly. When the push rod 30 is pushed in, the intermediate convex portion 31 thereof and the rotating cam 60 move backward toward the back inside the through-hole 54 of the inner portion 50.

When the inner portion 50 moves backward, the engagement projection 61 of the rotating cam 60 rises from the locking groove 57 of the lock portion 56, and the rotating cam 60 becomes rotatable.

At that time, by the engagement between the movable-side cam portion 62 of the rotating cam 60 and the fixed-side cam portion 35 of the push rod 30, the rotating cam 60 rotates, and the engagement projection 61 thereof faces the slide groove 55 of the inner portion 50 so as to release the locked state of the lock device.

In that state, when the force of pushing the push rod 30 in is released, the rotating cam 60 is pushed back by the urging force of the spring 40 (urging device) through the sleeve 70 so as to move forward.

At that time, the engagement projection 61 of the rotating cam 60 slides inside the slide groove 55 of the inner portion 50. Consequently, the intermediate convex portion 31 of the push rod 30 is pushed by the urging force of the spring 40 inside the case main member 90, as shown in FIG. 1, through the sleeve 70 and the rotating cam 60, and the upper-side rod portion 32 protrudes from the case main member 90, and the push lifter 10 comes to the extended state again.

(Attachment Position of the Push Lifter 10)

In the push lifter 10, in the attachment state of the case 20 relative to the vehicle body side, as shown in FIG. 1, the boot 80 side is located in the attachment upper direction a, and the case 20 side is located on the lower side. Specifically, the boot 80 side is located on the upper side, and the bottom wall 111 side of the case 20 is attached in such a way so as to incline downwardly in the obliquely downward direction.

At that time, as shown in FIG. 2 and FIG. 6, the cap 100 is attached such that the arrow mark faces upwardly and the recessed portion 103 faces downwardly.

(Air Venting Operation)

Air venting inside the case 20 is carried out through the air vent portion 114 which is a hole in the case main member 90. Namely, as shown in FIG. 1, the air discharged from the air vent portion 114 is discharged from the drainage portion 122 of the cap 100 through the first air flow channel 130 and the second air flow channel 131 formed between the case main member 90 and the cap 100.

(Drainage Operation)

Drainage inside the case 20 is carried out by draining water toward the water-flow downward direction b from the drainage portion 122 of the cap 100.

Namely, in a case where water enters into the case main member 90, into the cap 100, or between the case main member 90 and the cap 100, the water drains from the drainage portion 122 of the cap 100 through the air vent portion 114 which is the hole in the case main member 90, the first air flow channel 130 and the second air flow channel 131 formed between the case main member 90 and the cap 100.

Second Embodiment

With FIG. 51 to FIG. 61, a second embodiment of the present invention will be explained.

A characteristic of the present embodiment is that the cap 100 of the first embodiment explained with FIG. 1 to FIG. 50 beforehand is omitted.

According to the present embodiment, compared to the first embodiment, the cap 100 can be omitted so as to simplify the structure of the case 200.

Figure 51:
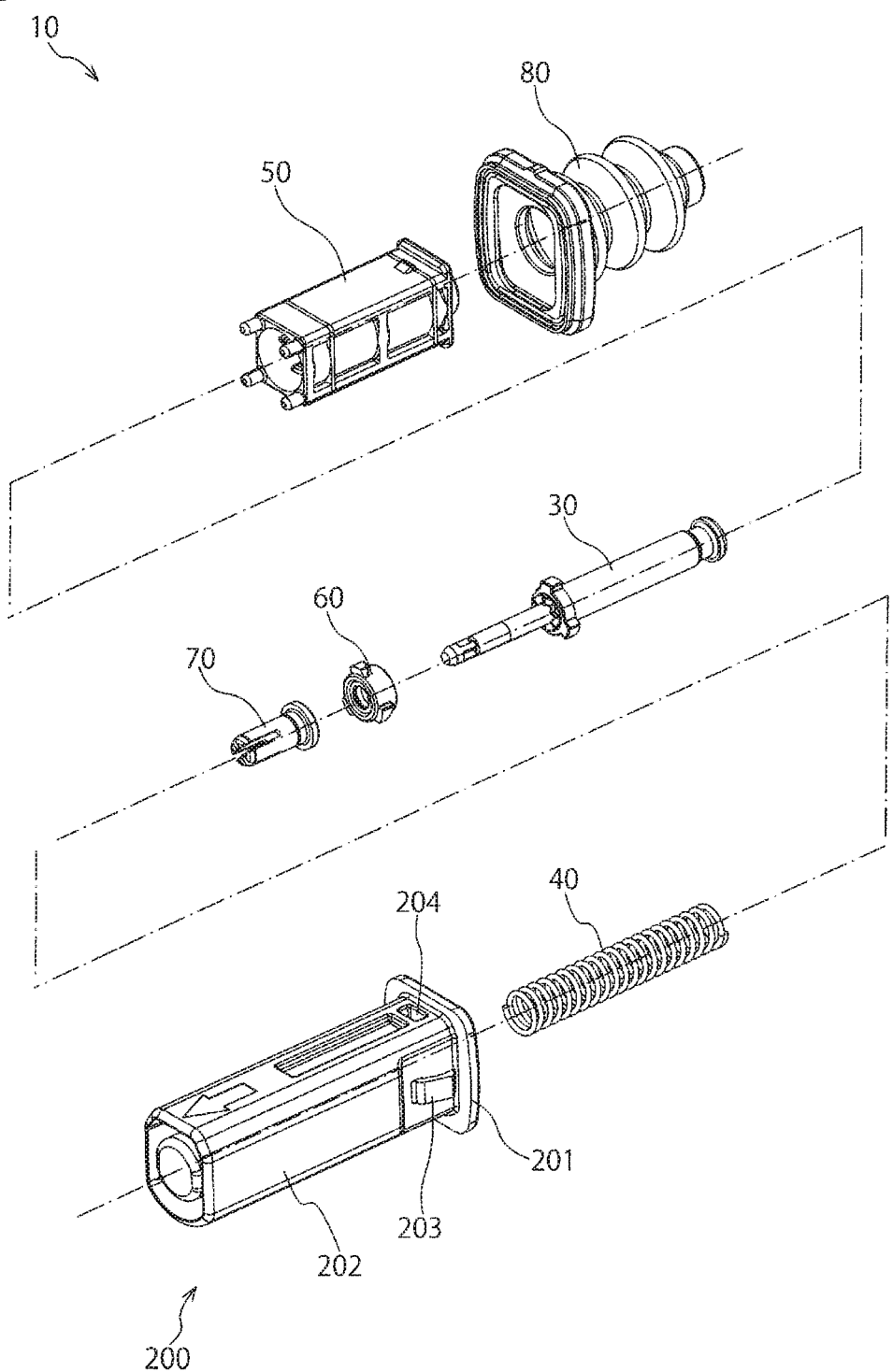
FIG. 51 shows a second embodiment of the present invention, and is an exploded perspective view of the push lifter.

As shown in FIG. 51, the push lifter 10 generally comprises the following parts. Incidentally, in an explanation of the present embodiment, the same symbols are assigned to the same components as those of the first embodiment, and the explanation thereof will be omitted.

(1) Case 200
(2) Push rod 30
(3) Spring 40 (urging device)
(4) Inner portion 50
(5) Rotating cam 60
(6) Sleeve 70
(7) Boot 80

Incidentally, the parts of the push lifter 10 are not limited to the aforementioned (1) to (7), and may comprise other parts such as the water stop O-ring and the like.

(Case 200)

As shown in FIG. 51 to FIG. 58, the case 200 has the cylindrical shape fixed to the vehicle body side (not shown in the drawings). The case 200 is formed in the rectangular cylindrical shape wherein one end portion is open and the other end portion is closed by the later-described bottom wall 211.

The case 200 is integrally formed by the thermoplastic synthetic resin having the moderate elasticity and rigidity, for example, the POM.

As shown in FIG. 51 to FIG. 58, the case 200 comprises the following respective portions.

Incidentally, the following (1) to (5) will be described later.

(1) Flange portion 201
(2) Body portion 202
(3) Vehicle-body attachment claws 203
(4) Inner attachment holes 204
(5) Lower portion 205

(Flange Portion 201)

As shown in FIG. 51 to FIG. 58, the flange portion 201 is located on the opening side of the case 200, and projects in the square ring shape in a plan view from an end portion thereof.

(Body Portion 202)

As shown in FIG. 51, the body portion 202 is formed in the hollow rectangular cylindrical shape from the flange portion 201.

(Vehicle-Body Attachment Claws 203)

As shown in FIG. 51, a pair of vehicle-body attachment claws 203 projects from side faces arranged back to back of the body portion 202 in the claw shape, and faces each other away from the flange portion 201. Although it is not shown in the drawings, the case 200 is unrotatably fixed to the vehicle body side (not shown in the drawings) by the pair of vehicle-body attachment claws 203.

(Inner Attachment Holes 204)

As shown in FIG. 51, the inner attachment holes 204 are formed in the rectangular hole shape on the side faces arranged back to back of the body portion 202, i.e. by having a phase difference of 90 degrees different from the vehicle-body attachment claws 203. As shown in FIG. 57, the inner portion 50 is inserted into the hollow portion of the body portion 202, and the case attachment claws 53 of the inner portion 50 fit into the inner attachment holes 204 from the inside, so that the inner portion 50 is unrotatably fixed into the hollow portion of the body portion 202.

(Lower Portion 205)

As shown in FIG. 57, the lower portion 205 is located on the later-described closed bottom wall 211 side of the case 200, and in the attachment state of the case 200 relative to the vehicle body side, the lower portion 205 is located on the lower side.

As shown in FIG. 55, FIG. 57, FIG. 58, and FIG. 61, the lower portion 205 comprises the following respective portions.

Incidentally, the following (1) to (6) will be described later.

(1) Inner peripheral wall 210
(2) Bottom wall 211
(3) Folded portion 212
(4) Outer peripheral wall 213
(5) Drainage portion 214
(6) Air vent portion 215

(Inner Peripheral Wall 210)

Figure 55:
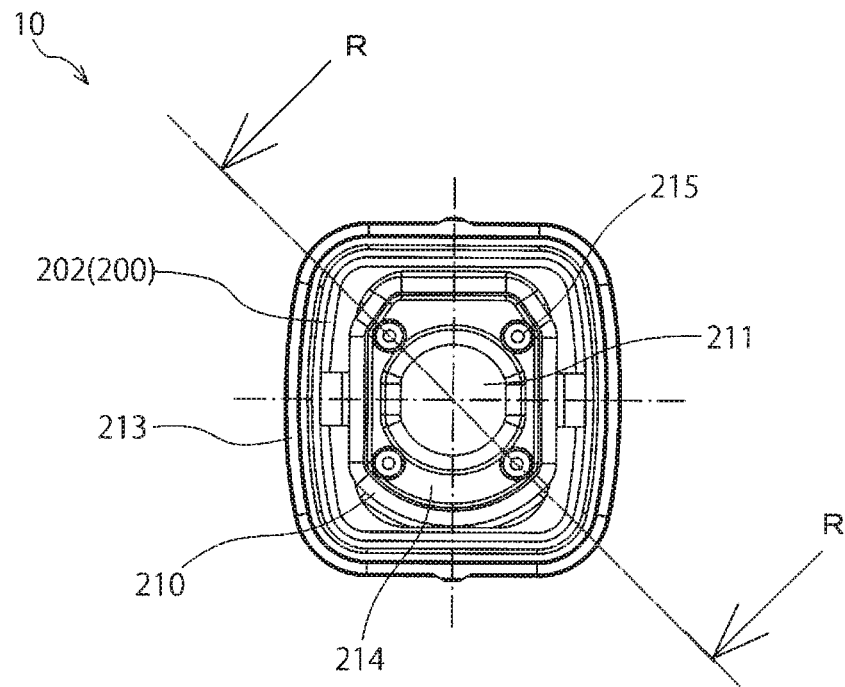
FIG. 55 shows the second embodiment of the present invention, and is a left side view of the push lifter.

As shown in FIG. 55 and FIG. 57, the inner peripheral wall 210 has the cylindrical shape.

(Bottom Wall 211)

Figure 56:
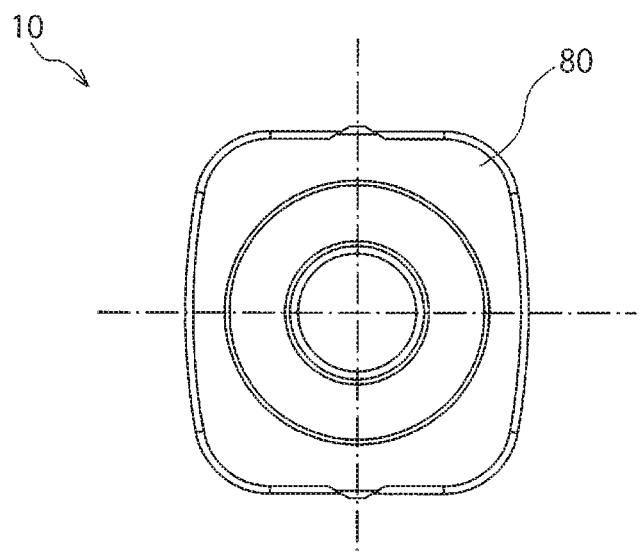
FIG. 56 shows the second embodiment of the present invention, and is a right side view of the push lifter.

As shown in FIG. 55 to FIG. 57, the bottom wall 211 closes the bottom of the inner peripheral wall 210.

(Folded Portion 212)

As shown in FIG. 57, the folded portion 212 is located at an upper edge portion on a side opposite to a lower edge portion to which the bottom wall 211 continues in the inner peripheral wall 210, and the folded portion 212 annularly extends outwardly in the radial direction from the inner peripheral wall 210.

(Outer Peripheral Wall 213)

As shown in FIG. 55 and FIG. 57, the outer peripheral wall 213 continues to the folded portion 212, and surrounds the circumference of the inner peripheral wall 210 away from the inner peripheral wall 210.

(Drainage Portion 214)

For example, as shown in FIG. 55 and FIG. 57, the drainage portion (214) is located between the inner peripheral wall (210) and the outer peripheral wall (213), and opens at a bottom toward a bottom wall (211) side, and in an attachment state of the case (200) relative to the vehicle body side, the drainage portion (214) can drain toward an open face (214').

Here, in "the attachment state of the case (200) relative to the vehicle body side", for example, as shown in FIG. 57, the boot (80) side is located in an attachment upward direction (c), and a case (200) side is located on the lower side.

For example, the boot (80) side is located on the upper side, is attached such that the bottom wall (211) side of the case (200) inclines downwardly in the obliquely downward direction, and the boot (80) side is formed such that when water enters into the case (200), the water flows down through an inside of the drainage portion 214 toward the open face (214') so as to drain from the open face (214').

(Air Vent Portion 215)

As shown in FIG. 55, the air vent portion 215 is located at the folded portion 212, and communicates with the inside of the inner peripheral wall 210 and the drainage portion 214.

Here, although it is not shown in the drawings, the air vent portion 215 is located on the upper side relative to the open face of the drainage portion 214 in the attachment state of the case 200 relative to the vehicle body side.

(Extended State of the Push Lifter 10)

Next, the extending-and-shortening operation of the push lifter 10 in an assembly state comprising the aforementioned structures will be explained.

Figure 58:
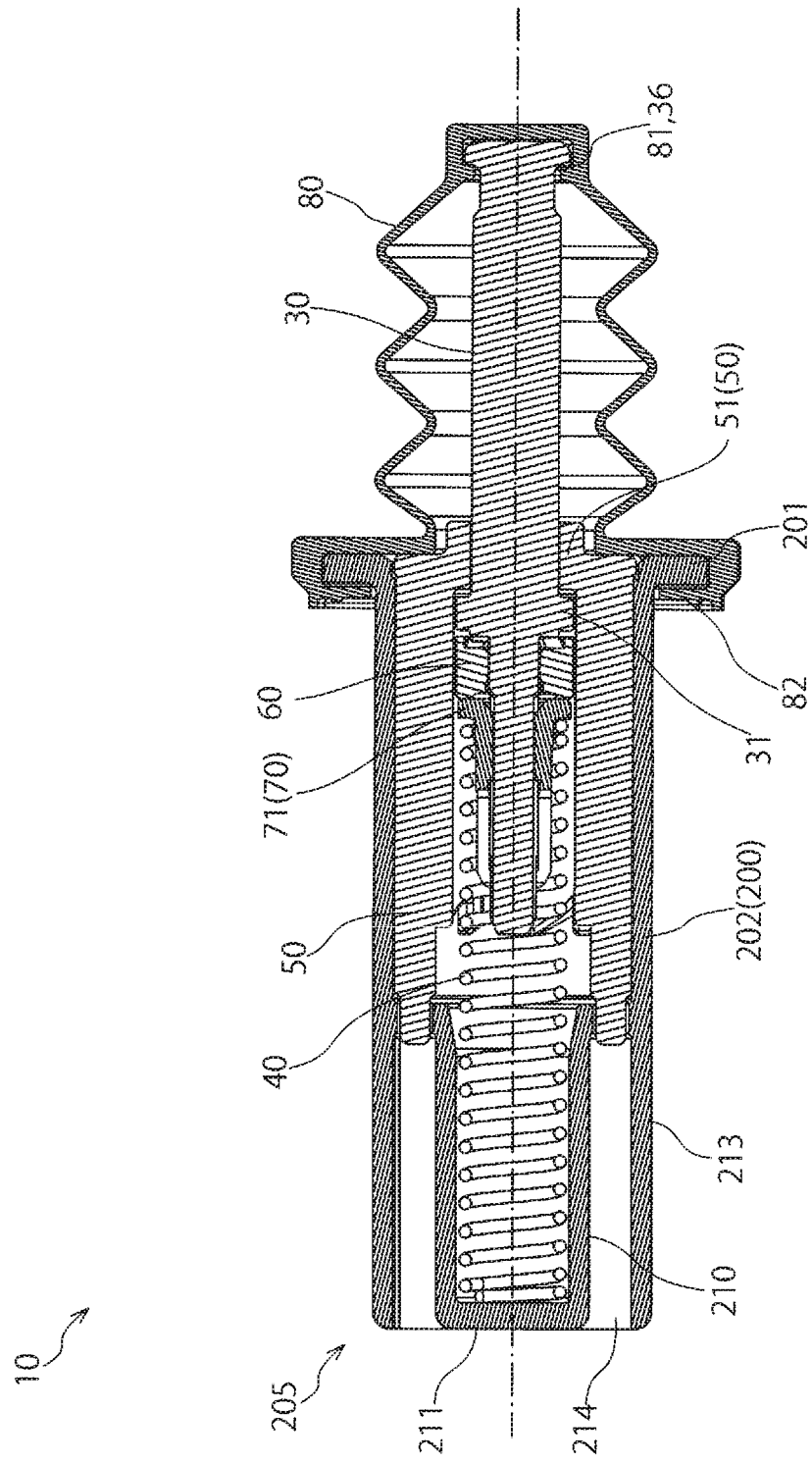
FIG. 58 is a cross-sectional view taken along a line R-R in FIG. 54.
Figure 59:
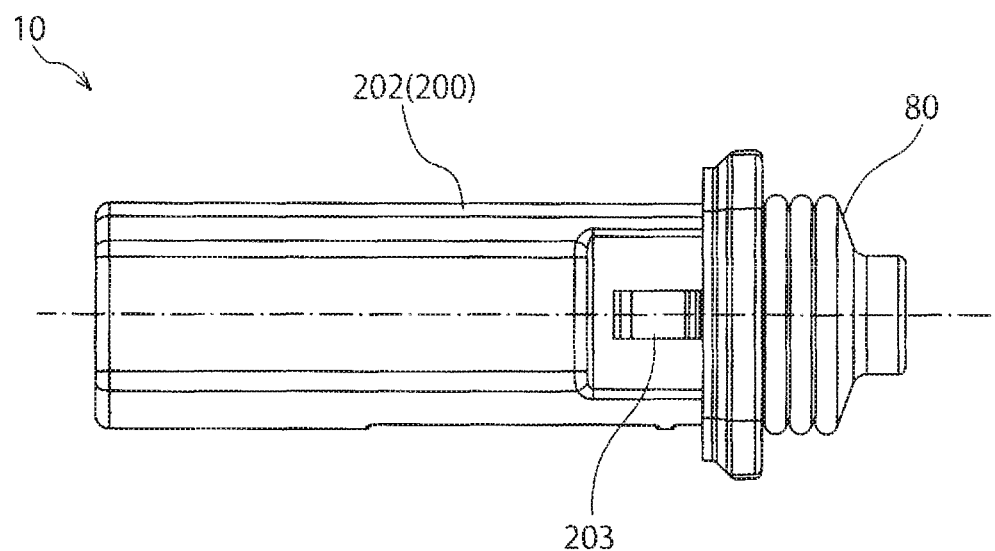
FIG. 59 shows the second embodiment of the present invention, and is a front view in a locked state of the push lifter.
Figure 60:
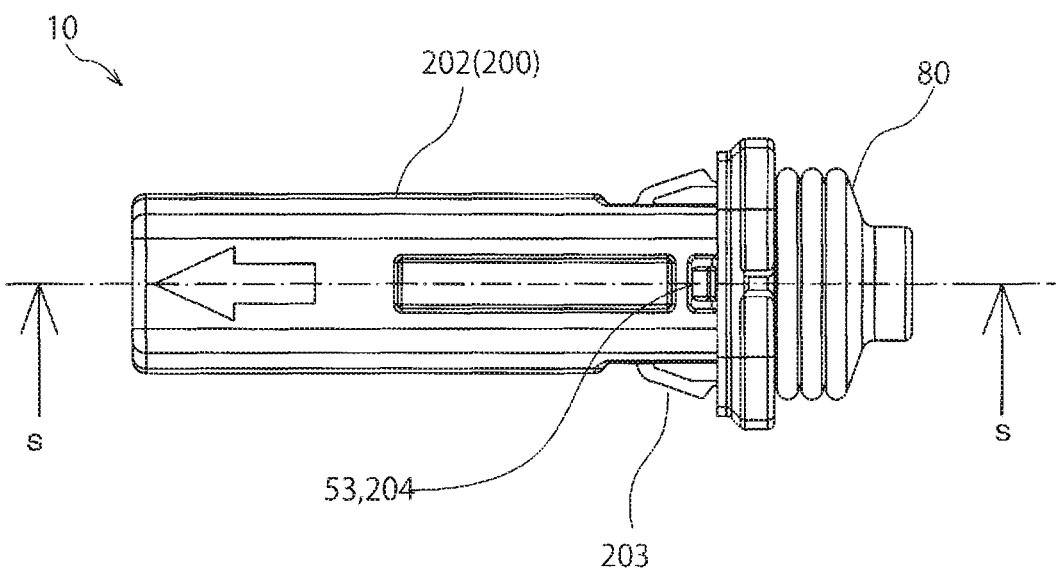
FIG. 60 shows the second embodiment of the present invention, and is a plan view in the locked state of the push lifter.

First, in the extended state of the push lifter 10, the lock device is in the unlocked state, and as shown in FIG. 57 and FIG. 58, the intermediate convex portion 31 of the push rod 30 is pushed by the urging force of the spring 40 inside the case 200 through the sleeve 70 and the rotating cam 60, and the upper-side rod portion 32 protrudes from the case 200.

The upper-side rod portion 32 protrudes so as to push the fuel lid (not shown in the drawings) to open through the boot 80. Consequently, the fuel lid (not shown in the drawings) which has pushed can be manually opened.

(Shortened State of the Push Lifter 10)

In contrast, in order to transfer the push lifter 10 from the extended state to the shortened state, the push rod 30 may be pushed into the case 200 through the fuel lid (not shown in the drawings) or directly against the urging force of the spring 40 (urging device).

When the push rod 30 is pushed in, the intermediate convex portion 31 thereof and the rotating cam 60 move backward toward the back inside the through-hole 54 of the inner portion 50.

When the rotating cam 60 moves backward toward the back inside the through-hole 54, the rotating cam 60 comes out of the through-hole 54 so as to become rotatable.

At that time, by the engagement between the movable-side cam portion 62 of the rotating cam 60 and the fixed-side cam portion 35 of the push rod 30, the rotating cam 60 rotates, and the engagement projection 61 thereof reaches the lock portion 56 of the inner portion 50.

Figure 61:
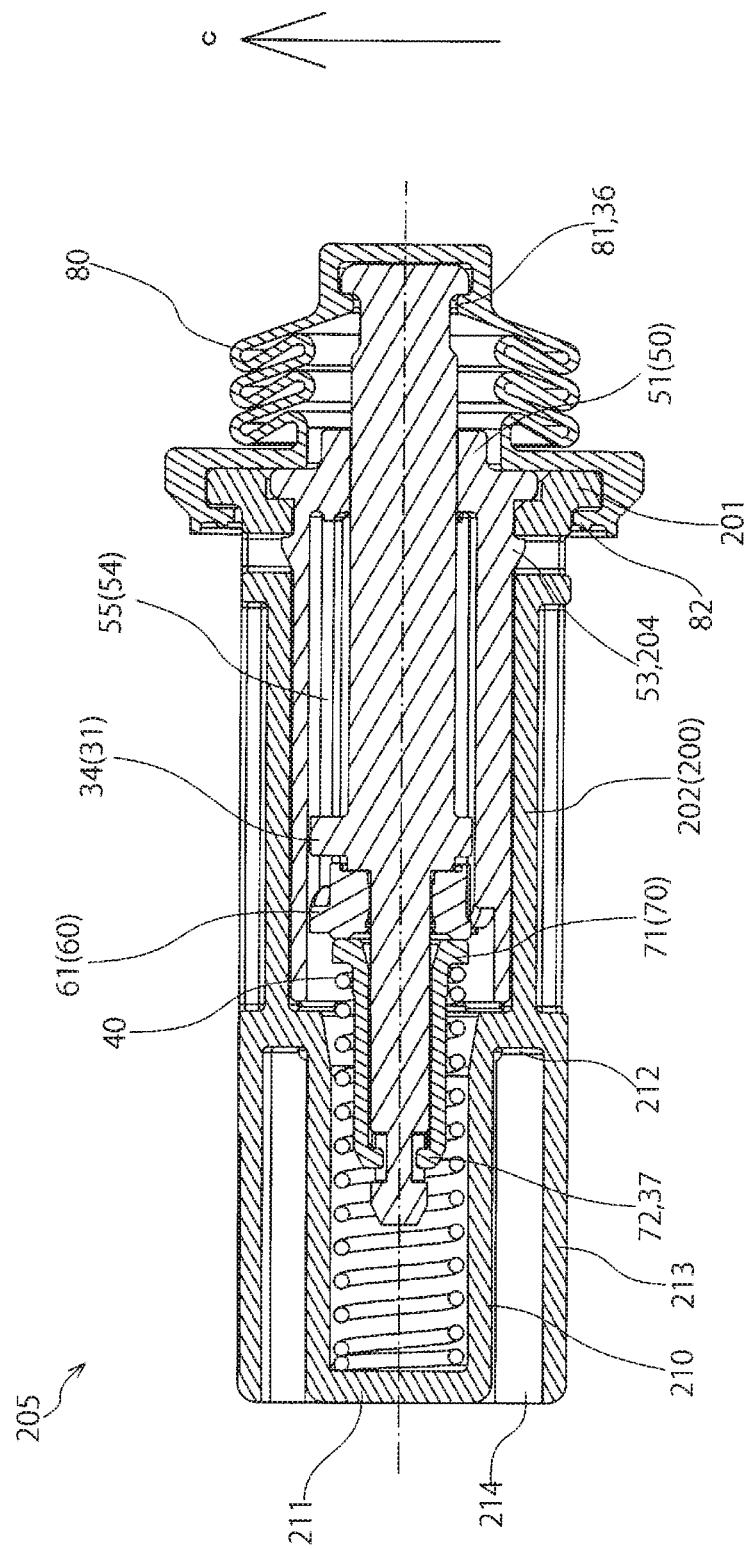
FIG. 61 is a cross-sectional view taken along a line R-R in FIG. 49.

In that state, when the force of pushing the push rod 30 in is released, the rotating cam 60 is pushed back by the urging force of the spring 40 (urging device) through the sleeve 70 so as to move forward, so that the engagement projection 61 thereof fits into the locking groove 57 of the lock portion 56, and the lock device becomes the locked state. Consequently, the urging force of the spring 40 (urging device) is received by the lock portion 56 of the inner portion 50, and as shown in FIG. 61, the push lifter 10 maintains the shortened state.

(Release of the Locked State of the Lock Device)

In order to extend the push lifter 10 again, the push rod 30 may be slightly pushed toward the inside of the case 200 through the fuel lid (not shown in the drawings) or directly. When the push rod 30 is pushed in, the intermediate convex portion 31 thereof and the rotating cam 60 move backward toward the back inside the through-hole 54 of the inner portion 50.

When the inner portion 50 moves backward, the engagement projection 61 of the rotating cam 60 rises from the locking groove 57 of the lock portion 56, and the rotating cam 60 becomes rotatable.

At that time, by the engagement between the movable-side cam portion 62 of the rotating cam 60 and the fixed-side cam portion 35 of the push rod 30, the rotating cam 60 rotates, and the engagement projection 61 thereof faces the slide groove 55 of the inner portion 50 so as to release the locked state of the lock device. In that state, when the force of pushing the push rod 30 in is released, the rotating cam 60 is pushed back by the urging force of the spring 40 (urging device) through the sleeve 70 so as to move forward.

At that time, the engagement projection 61 of the rotating cam 60 slides inside the slide groove 55 of the inner portion 50. Consequently, the intermediate convex portion 31 of the push rod 30 is pushed by the urging force of the spring 40 inside the case 200, as shown in FIG. 57, through the sleeve 70 and the rotating cam 60, and the upper-side rod portion 32 protrudes from the case 200, and the push lifter 10 comes to the extended state again.

(Attachment Position of the Push Lifter 10)

In the push lifter 10, in the attachment state of the case 200 relative to the vehicle body side, as shown in FIG. 57, the boot 80 side is located in the attachment upper direction c, and the case 200 side is located on the lower side.

Specifically, the boot 80 side is located on the upper side, and the bottom wall 211 side of the case 200 is attached in such a way so as to incline downwardly in the obliquely downward direction.

Figure 52:
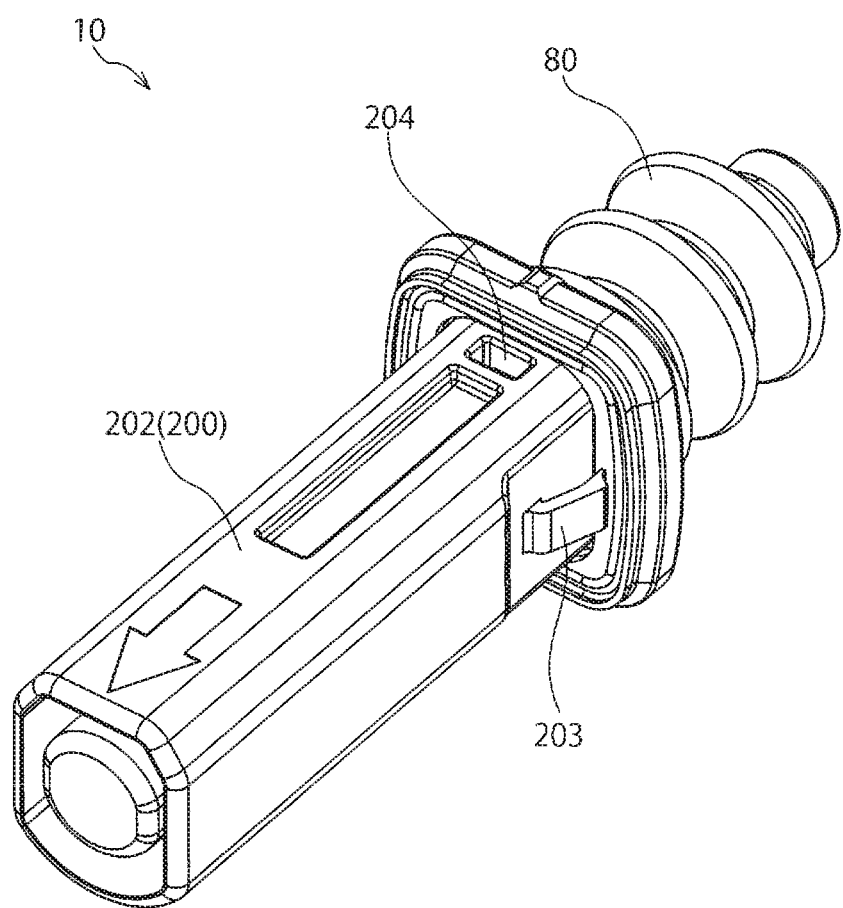
FIG. 52 shows the second embodiment of the present invention, and is a perspective view of the push lifter.
Figure 53:
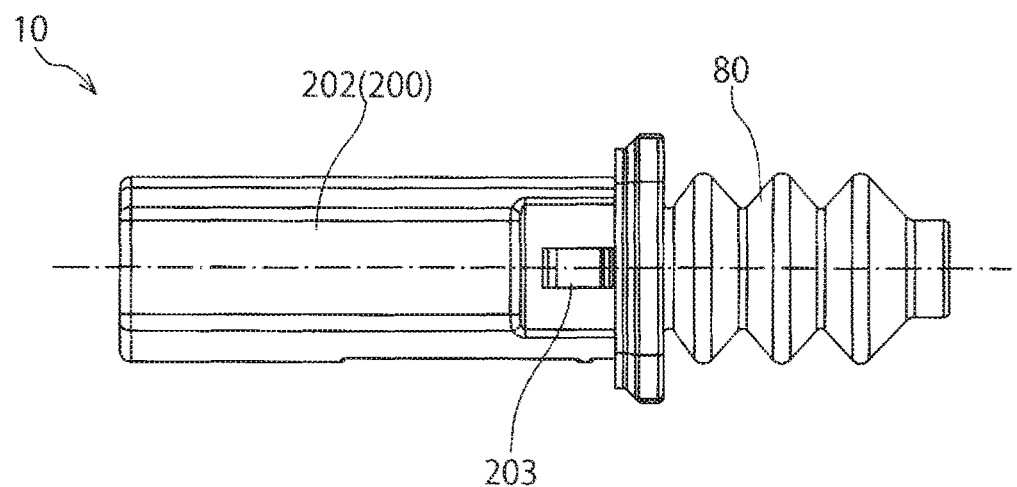
FIG. 53 shows the second embodiment of the present invention, and is a front view of the push lifter.
Figure 54:
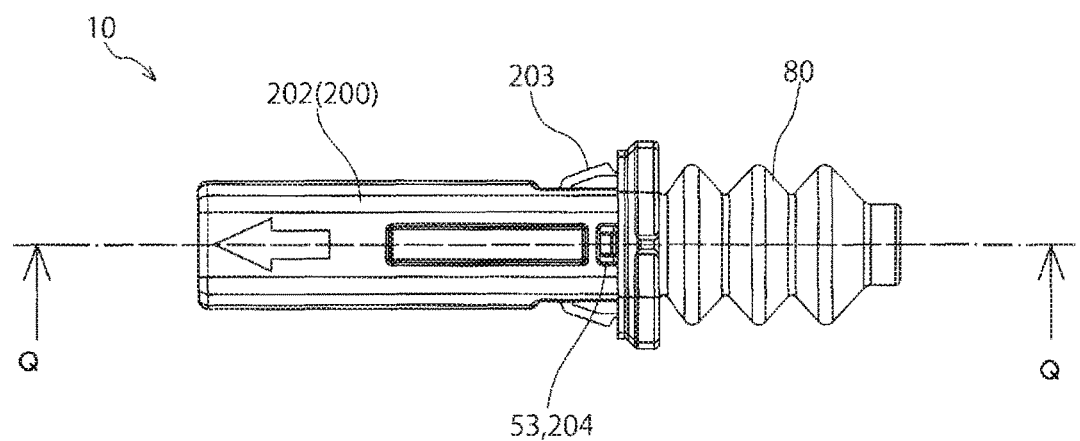
FIG. 54 shows the second embodiment of the present invention, and is a plan view of the push lifter.

At that time, as shown in FIG. 52 and FIG. 54, the cap 100 is attached such that the arrow mark faces upwardly and the later-described recessed portion 103 faces downwardly.

(Air Venting Operation)

Air venting inside the case 200 is carried out through the air vent portion 215 which is a hole in the case 200 shown in FIG. 55. Namely, as shown in FIG. 57, the air discharged from the air vent portion 215 is discharged from the drainage portion 214 formed between the inner peripheral wall 210 and the outer peripheral wall 213.

(Drainage Operation)

The drainage inside the case 200 is carried out through the drainage portion 214.

Namely, in a case where the water enters into the case 200, the water drains from the drainage portion 214 through the air vent portion 215 which is the hole in the case 200.

While the invention has been explained with reference to the specific embodiments of the invention, the explanation is illustrative and the invention is limited only by the appended claims.

What is claimed is:

1. A push-lifter for a vehicle fixed to a vehicle body side facing a fuel lid for pushing the fuel lid to open toward an outside of the vehicle, comprising:
    a case having a cylindrical shape configured to be fixed to the vehicle body side;
    a push rod slidably held inside the case, and protruding from an inside of the case for pushing the fuel lid to open,
    an urging device located inside the case, and urging the push rod toward a forward-movement position protruding from the inside of the case; and
    a lock device located between the case and the push rod for locking the push rod to a backward-movement position of the case by pushing the push rod against an urging force of the urging device,
    wherein the case includes a cap having a cylindrical shape for covering an outside of a lower portion of the case, the lower portion of the case including a peripheral wall having a cylindrical shape surrounding a circumference of the lower portion; a bottom wall closing a bottom of the peripheral wall; and an air vent portion opening at a center of the bottom wall, and
    the cap includes a bottom portion located away from the bottom wall and facing the bottom wall, and forming a first air flow channel communicating with the air vent portion between the bottom portion and the bottom wall; a side portion located away from the peripheral wall and continuing to the bottom portion, the side portion having a cylindrical shape forming a second air flow channel communicating with the first air flow channel between the side portion and the peripheral wall; and a drainage portion located on a lower side in an attachment state of the case relative to the vehicle body side, the drainage portion communicating with the second air flow channel, and opening toward the bottom portion.

2. A push-lifter for a vehicle according to claim 1, wherein the drainage portion includes a groove portion concaved outwardly in a radial direction from an inner peripheral face of the side portion, and communicating with the second air flow channel; and
    an opening portion opening toward the bottom portion from the groove portion so as to drain water flowing down through the second air flow channel toward the opening portion from the groove portion while meandering the water in an L shape in cross section.

3. A push-lifter for a vehicle fixed to a vehicle body side facing a fuel lid for pushing the fuel lid to open toward an outside of the vehicle, comprising:
    a case having a cylindrical shape configured to be fixed to the vehicle body side;
    a push rod slidably held inside the case, and protruding from an inside of the case to push the fuel lid to open;
    an urging device located inside the case, and urging the push rod toward a forward-movement position protruding from an inside of the case; and
    a lock device located between the case and the push rod for locking the push rod to a backward-movement position of the case by pushing the push rod against an urging force of the urging device,
    wherein the case includes an inner peripheral wall having a cylindrical shape, a bottom wall closing a bottom of the inner peripheral wall; a folded portion located at an upper edge portion on a side opposite to a lower edge portion where the bottom wall continues, and annularly extending outwardly in a radial direction from the inner peripheral wall; an outer peripheral wall continuing to the folded portion and surrounding a circumference of the inner peripheral wall away from the inner peripheral wall; a drainage portion located between the inner peripheral wall and the outer peripheral wall, and opening at a bottom toward a bottom wall side so as to drain toward an open face in an attachment state of the case relative to the vehicle body side; and an air vent portion located in the folded portion, and communicating an inside of the inner peripheral wall with the drainage portion.

\* \* \* \* \*